United States Patent
De Vega Rodrigo

(10) Patent No.: US 12,388,629 B2
(45) Date of Patent: Aug. 12, 2025

(54) MESSAGELESS SECURE MULTI-PARTY COMPUTATIONS WITH PASSIVE AND ACTIVE ADVERSARIES

(71) Applicant: SEDICII INNOVATIONS LTD., Waterford (IE)

(72) Inventor: Miguel De Vega Rodrigo, Santa Cruz de Tenerife (ES)

(73) Assignee: SEDICII INNOVATIONS LTD. (IE)

( * ) Notice: Subject to any disclaimer, the term of this patent is extended or adjusted under 35 U.S.C. 154(b) by 134 days.

(21) Appl. No.: 18/217,048

(22) Filed: Jun. 30, 2023

(65) Prior Publication Data

US 2024/0007273 A1  Jan. 4, 2024

Related U.S. Application Data

(60) Provisional application No. 63/357,815, filed on Jul. 1, 2022.

(51) Int. Cl.
G06F 21/00 (2013.01)
H04L 9/08 (2006.01)

(52) U.S. Cl.
CPC .......... H04L 9/085 (2013.01); *H04L 2209/46* (2013.01)

(58) Field of Classification Search
None
See application file for complete search history.

(56) References Cited

U.S. PATENT DOCUMENTS 8,713,329 B2 * 4/2014 Schneider ............... H04L 9/085
 713/168
2017/0155634 A1 * 6/2017 Camenisch ............. H04L 9/085
(Continued)

OTHER PUBLICATIONS

Castagnos Guilhem et al., "Encryption Switching Protocols Revisited: Switching Modulo", Jul. 29, 2017 (Jul. 29, 2017), Topics In Cryptology-CT-RSA 2020: The Cryptographers' Track at the RSA Conference 2020, San Francisco, CA, USA, Feb. 24-28, 2020, Cornell University Library, 201 Olin Library Cornell University Ithaca, NY 14853, 35 pages, XP047557996, [retrieved on Jul. 29, 2017] section 5.2; figures 10, 11.

(Continued)

*Primary Examiner* — Maung T Lwin
(74) *Attorney, Agent, or Firm* — Sterne, Kessler, Goldstein & Fox P.L.L.C.

(57) ABSTRACT

Disclosed are methods and systems for calculating an arithmetic function expressed as addition of groups of multiplications of a set of private input secrets held by dealer nodes. Random exponent blinding factors are generated, and each computing node receives polynomial shares from each exponent blinding factor and a polynomial share and a public generator from the multiplicative group of integers modulo a prime number. The indexing integers are partitioned among the computing nodes, and each computing node computes a set of shares from the polynomial shares then sent to the dealer nodes which reconstruct the corresponding dealer blinding factor, and use it to create and send a particle to the computing nodes. The computing nodes then calculate from the received particles a result share of a polynomial which, when combined by a result node, allow the evaluation of complete polynomial which includes the result of the arithmetic function.

25 Claims, 5 Drawing Sheets

(56) References Cited

U.S. PATENT DOCUMENTS

| | | |
|---|---|---|
| 2019/0296896 A1* | 9/2019 | Resch .................. H04L 9/0656 |
| 2020/0228325 A1* | 7/2020 | Fan ........................ G06N 20/00 |
| 2023/0049860 A1* | 2/2023 | Poorebrahim Gilkalaye .............. G06N 3/0464 |

OTHER PUBLICATIONS

Hazay Carmit et al., "Efficient RSA Key Generation and Threshold Paillier in the Two-Party Setting", Journal of Cryptology, Springer US, New York, vol. 32, No. 2, Feb. 5, 2018 (Feb. 5, 2018), 51 pages, XP037088139, ISSN: 0933-2790, DOI: 10.1007/S00145-017-9275-7, [retrieved on Feb. 5, 2018], section 7.1.1.

International Search Report for International Application No. PCT/EP2023/068185, European Patent Office, Netherlands, mailed on Oct. 13, 2023, 4 pages.

* cited by examiner

MESSAGELESS SECURE MULTI-PARTY COMPUTATIONS WITH PASSIVE AND ACTIVE ADVERSARIES

TECHNICAL FIELD

This invention relates to a new Secure Multi Party Computation (SMPC) protocol [Jak15] that can do the bulk of the computations without requiring the nodes to exchange any message. This represents a key improvement over state-of-the-art SMPC protocols which require the exchange of messages causing scalability problems.

BACKGROUND ART

Secure Multi Party Computation (SMPC) enables a set of parties to collaboratively compute a function over their inputs while keeping them private. There are several SMPC flavours described in the literature, including Yao's Garbled Circuits [Yao08], GMW [GMW87][Sch13], BGW [BGW88], SPDZ [SPDZ12], BMR [BMR90] and GESS [GESS05].

There are two main constructions of SMPC: Circuit Garbling (CG) and Linear Secret Sharing (LSS). Circuit garbling requires encrypting keys in a specific order to simulate the function evaluation. Linear Secret Sharing breaks down the inputs into shares which are distributed among the nodes. We focus on SMPC flavours using LSS.

The following is a list of the main roles for the nodes participating in a SMPC computation:
- Dealer node: These nodes contribute inputs to the computation
- Computing node: These nodes perform the actual SMPC computation on the inputs provided by Dealer Nodes
- Result node: These nodes reconstruct the result from a finished SMPC computation FIG. 1 (prior art) shows a generic SMPC setup. The purpose of the network is to jointly compute the result from evaluating a function over a set of input values without revealing them. There are three distinct sets of nodes. The Dealer Nodes provide the input values. Specifically, each Dealer Node may contribute with one or more values to the joint evaluation of the function. Dealer nodes wish their values to remain secret at any time. Thus, they use a LSS mechanism in order to generate and distribute shares from each secret input value to the computing nodes. The computing nodes carry out the actual function evaluation using only the shares from the secret inputs, which prevents them from seeing the actual secret inputs. Following the SMPC protocol, the computing nodes are able to obtain shares from the result obtained after evaluating the function with the secret inputs. Specifically, each computing node obtains one share from the result. The computing nodes then send their result shares to one or several result nodes, which using the LLS mechanism are able to reconstruct the actual result.

LSS SMPC protocols comprise the following three phases, sometimes preceded by an additional phase:
- Phase 0 (optional)—Pre-processing: Some LSS SMPC protocols require nodes to run preliminary computations like the generation of multiplicative triplets in Beaver's version of BGW, or in SPDZ. These computations are not related to the private inputs of any particular SMPC computation and therefore can take place in a previous offline phase.
- Phase 1—Share distribution: Each Dealer Node breaks down each private input to the computation into a number N of shares and sends each share to a different computing node. Each share reveals no information about the private input. It is only when all N shares from a private input are gathered that it can be reconstructed.
- Phase 2—Computation: Each computing node has one share from each private input to a computation. The computation consists of evaluating the output of a function over the private inputs. In order to do this, the computing nodes perform operations on their shares that depend on the specific function to be evaluated by the SMPC protocol.
- Phase 3—Result reconstruction: After Phase 2, each computing node has obtained a share from the result of the computation (i.e. the function to be evaluated). They send their share to one or several result nodes. After gathering all N shares from the result, a result node can reconstruct the output of the function that was jointly evaluated.

FIG. 2 (prior art) illustrates the four phases of a generic SMPC protocol using LSS. The pre-processing phase is necessary in some SMPC protocols and may be executed in time long before the actual function evaluation takes place because it does not depend on the input data. The other three phases are executed synchronously, one after the other.

For example, let us assume that two Dealer Nodes have each one a string. They would like the network of computing nodes to evaluate the result from comparing the two strings and to communicate this result to a result node. The strings are private to the Dealer Nodes, so they should not be sent over to the computing nodes in plaintext or in encrypted form. Each Dealer Node breaks down their private string into N shares and send each share to a different computing node. After receiving one share per each one of the two strings to be compared, the computing nodes follow the SMPC protocol to obtain a share of the result from the computation. This result could be a Boolean representing a string match with a TRUE value and a string mismatch with a FALSE value. Each node sends their share of the result to a result node, which reconstructs the TRUE or FALSE result from the string comparison.

The main scalability problem with SMPC is the communication complexity. A large number of message exchanges and/or communication bandwidth is required in order for the computing nodes to collaboratively obtain in Phase 2 a share of the result of the function being evaluated when this function is complex. By complex function we mean a function with a large number of inputs and a large number of operations on those inputs. Real-world applications of SMPC typically require complex functions, which severely affects the applicability of SMPC in production scenarios.

For example, in BGW SMPC computing nodes evaluate arithmetic functions on integer inputs comprising additions and multiplications. Computing nodes running BGW can process additions without the need to exchange any message. However, the evaluation of multiplications requires the exchange of messages. Complex functions will have additions and multiplications, making the overall BGW function evaluation slow.

We refer to SMPC flavours evaluating arithmetic functions as SMPC in the arithmetic setting.

Shamir's Secret Sharing (SSS) is a well-known cryptographic primitive which allows sharing a secret among N parties [Cra15], which is incorporated herein by reference. To that end, SSS makes use of a degree-T polynomial $g(x)$ defined on a finite field $F_q$ for $q=p^n$, where p is a prime umber, n is a natural number greater than zero, and $N \geq T+1$. The polynomial $g(x)=a_0+a_1x+ \ldots +a_Tx^T$ has random coefficients except for $a_0=s$ which is set to be equal to the secret than needs to be shared. Each one of the N parties obtains a share [s] from the secret s. Specifically, the share from the n-th party is defined as $[s]_n=g(x_n)$. That is, it is equal to the value of the polynomial evaluated at a public pre-arranged abscissa $x_n$. We denote:

$$[s]_0, [s]_1, \ldots, [s]_{N-1} \leftarrow \text{SHAMIR}(s)$$

to the process that generates N shares from a secret s.

To reconstruct the secret, it suffices to gather T+1 shares, since they fully characterize a degree-T polynomial. The secret reconstruction process makes use of polynomial interpolation. A common interpolation option is to use Lagrange interpolation [Cra15], which is incorporated herein by reference. Another less common interpolation option is to use the inverse of the Vandermonde matrix (See https://en.wikipedia.org/wiki/Polynomial_interpolation). We denote:

$$s \leftarrow \text{INTERPOLATE}([s]_0, [s]_1, \ldots, [s]_T)$$

to the process that reconstructs a secret from T+1 shares using Lagrange interpolation, keeping in mind that this process can be replaced by any other equivalent polynomial interpolation method and is not limited to these examples. More specifically, an implementation of INTERPOLATE that returns the secret hidden at the abscissa x=0 in a degree-T polynomial follows:

$$\text{INTERPOLATE}([s]_0, [s]_1, \ldots, [s]_T) = \sum_{i=0}^{T}[s]_i \left( \prod_{\substack{0 \leq j \leq T \\ j \neq i}} \frac{x_j}{x_j - x_i} \right)$$

Typically, one creates more shares than strictly needed for the reconstruction (N≥T+1). The additional redundancy is used to be able to reconstruct a secret even if some shares are missing or if malicious parties have modified the value of their share. In this situation, error correction codes (ECC) are typically used, such as Reed Solomon codes [Mann13], which is incorporated herein by reference. For example, if N=3T+1, ECCs are capable of correcting up to T wrong (or missing) shares. We denote:

$$s \leftarrow ECC([s]_0, [s]_1, \ldots, [S]_{N-1})$$

to the process that reconstructs a secret from N shares using error correction codes.

DISCLOSURE OF THE INVENTION

In one aspect, there is provided a computer-implemented method, carried out between a plurality of D dealer nodes and N computing nodes, for use in calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$, $m \in \{0, 1, \ldots, M_a-1\}$ identify private input secrets from the set of S secrets, and where the S secrets are selected from integers, real numbers or complex numbers, and each secret $s_{i_{a,m}}$ is known to one of said dealer nodes, wherein the method comprises:

(a) providing each computing node n, $n \in \{0, 1, \ldots, N-1\}$, with a respective set of shares $[\alpha_{a,0}]_n$, $[\alpha_{a,1}]_n$, ..., $[\alpha_{a,L-1}]_n$, for every addition $a \in \{0, \ldots, A-1\}$ where L is a number chosen such that $L > M_a$, $\forall a \in \{0, 1, \ldots, A-1\}$ and $L > D$, and such that:

(i) the set of all the l-th shares $[\alpha_{a,l}]_n$, $l \in \{0, \ldots L-1\}$, from the N computing nodes together represent shares of a degree-T polynomial that hide a respective secret exponent blinding factor $\alpha_{a,l}$ at a certain abscissa such as x=0, with N≥T+1; and (ii) the set of exponent blinding factors $\alpha_{a,0}$, $\alpha_{a,1}$, ..., $\alpha_{a,L-1}$ for a given addition a are all elements of the multiplicative group $(Z/pZ)^x$ of integers modulo a prime number p;

(b) providing each computing node n, $n \in \{0, 1, \ldots, N-1\}$, with a respective set of shares $[\rho^{-\lambda_a}]_n$, where:

(i) $\rho$ is a public generator from the multiplicative group $(Z/pZ)^x$ of integers modulo p;

(ii) $\lambda_a$ is a secret exponent which satisfies $$\lambda_a = \sum_{l=0}^{L-1} \alpha_{a,l}$$

(iii) the set of all the shares $[\rho^{-\lambda_a}]_n$ from the N computing nodes together represent shares of a degree-T polynomial that hide the secret value $\rho^{-\lambda}$ at a certain abscissa such as x=0;

(c) for each addition a comprising $M_a$ multiplications, providing each of the computing nodes with the same partition sets $P_{a,0}, P_{a,1}, \ldots, P_{a,M_a-1}$ of the indexing set $\{0, 1, \ldots, L-1\}$ such that all partition sets are disjoint and non-empty;

(d) each computing node computing, for each addition a, a set of shares $[\lambda_{a,0}]_n$, $[\lambda_{a,1}]_n$, ..., $[\lambda_{a,M_a-1}]_n$ according to:

$$[\lambda_{a,m}]_n = \sum_{l \in P_{a,m}} [\alpha_{a,l}]_n$$

for $m \in \{0, \ldots, M_a-1\}$, wherein for a given addition a and multiplication m the set of the shares $[\lambda_{a,m}]_n$ for $n \in \{0, 1, \ldots, N-1\}$ together represent shares of a degree-T polynomial that hide the secret dealer blinding factor $\lambda_{a,m}$ at a certain abscissa such as x=0;

(e) each computing node n sending the respective share $[\lambda_{a,m}]_n$ for $a \in \{0, 1, \ldots, A-1\}$, $m \in \{0, 1, \ldots, M_a-1\}$, to the respective dealer node contributing the secret $s_{i_{a,m}}$ to the computation;

(f) each dealer node reconstructing, for each secret $s_{i_{a,m}}$ which it contributes to the computation, the corresponding dealer blinding factor $\lambda_{a,m}$;

(g) each dealer node sending, for each secret $s_{i_{a,m}}$ which it contributes to the computation, a particle $v_{a,m}$ to each of the computing nodes wherein:

$$v_{a,m} = s_{i_{a,m}} \cdot \rho^{\lambda_{a,m}}$$

(h) each computing node calculating, for each addition $a \in \{0, 1, \ldots, A-1\}$, a share $[r_a]_n$ from a degree-T polynomial $r_a(x)$ where:

$$[r_a]_n = [\rho^{-\lambda_a}]_n \cdot \prod_{m=0}^{M_a-1} v_{a,m}$$

(i) each computing node calculating a result share $[r]_n$ from a degree-T polynomial $r(x)$ where:

$$[r]_n = \sum_{a=0}^{A-1} [r_a]_n$$

(j) each computing node sending to one or more result node(s) their result share $[r]_n$ whereby the result node(s) may reconstruct the evaluation $r(0)$ of polynomial $r(x)$ from the received result shares $[r]_n$, said evaluation $r(0)$ being equal to the result of said arithmetic function $f$.

In certain embodiments, $N=T+1$.

Preferably, in other embodiments, $N>T+1$.

Preferably, the reconstruction of at least one of said polynomials employs error correction codes.

In certain preferred embodiments, $N \geq 3T+1$.

Preferably, step (c) of providing each of the computing nodes with the same partition sets comprises each computing nodes calculating the partition sets according to a shared set of rules.

Preferably, step (a) of providing each computing node n, $n \in \{0, 1, \ldots, N-1\}$, with a respective set of shares $[\alpha_{a,0}]_n$, $[\alpha_{a,1}]_n, \ldots, [\alpha_{a,L-1}]_n$ comprises the calculation, by a trusted node, of said sets of shares.

Preferably, the calculation of said sets of shares $[\alpha_{a,0}]_n$, $[\alpha_{a,1}]_n, \ldots, [\alpha_{a,L-1}]_n$ comprises the following steps by the trusted node:
(i) computing, for each addition $a \in \{0, \ldots, A-1\}$, L random exponent blinding factors $\alpha_{a,0}, \alpha_{a,1}, \ldots, \alpha_{a,L-1} \in (Z/pZ)^x$;
(ii) computing, for each of said exponent blinding factors $\alpha_{a,l}$ where $l \in \{0, \ldots L-1\}$, N shares $[\alpha_m]_0$, $[\alpha_m]_1, \ldots, [\alpha_m]_{N-1}$ of a degree-T polynomial that hides the value $\alpha_{a,l}$ at a certain abscissa such as $x=0$.

Preferably, step (b) of providing each computing node n, $n \in \{0, 1, \ldots, N-1\}$, with a respective set of shares $[\rho^{-\lambda_a}]_n$ comprises the calculation, by a trusted node, of said sets of shares.

Preferably, the calculation of said sets of shares $[\rho^{-\lambda_a}]_n$ comprises the following steps by the trusted node:
(i) computing, for each addition $a \in \{0, \ldots, A-1\}$, the value $\rho^{-\lambda_a}$, where $$\lambda_a = \sum_{l=0}^{L-1} \alpha_{a,l}$$

(ii) computing, for each value $\rho^{-\lambda_a}$, N shares $[\rho^{-\lambda_a}]_n$, $n \in \{0, 1, \ldots, N-1\}$, of a degree-T polynomial that hides the value $\rho^{-\lambda_a}$ at a certain abscissa such as $x=0$.

Preferably, the calculations of sets of shares by a trusted node are all carried out by the same trusted node.

Preferably, the method further comprises the evaluation, by said one or more result node(s), of the value $r(0)$ of polynomial $r(x)$.

There is further provided a non-transitory computer-program product comprising instructions which, when executed by a processor, cause the processor to operate as a computing node in a computer-implemented method, carried out between a plurality of D dealer nodes and N computing nodes, for use in calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$, $m \in \{0, 1, \ldots, M_a-1\}$ identify private input secrets from the set of S secrets, and where the S secrets are selected from integers, real numbers or complex numbers, and each secret $s_{i_{a,m}}$ is known to one of said dealer nodes, wherein the instructions cause the processor to operate as the n-th computing node, $n \in \{0, 1, \ldots, N-1\}$ by:
(a) receiving a respective set of shares $[\alpha_{a,0}]_n$, $[\alpha_{a,1}]_n, \ldots, [\alpha_{a,L-1}]_n$, for every addition $a \in \{0, \ldots, A-1\}$ where L is a number chosen such that $L > M_a$, $\forall a \in \{0, 1, \ldots, A-1\}$ and $L > D$, and such that:
  (i) the set of all the l-th shares $[\alpha_{a,l}]_n$, $l \in \{0, \ldots L-1\}$, from the N computing nodes together represent shares of a degree-T polynomial that hide a respective secret exponent blinding factor $\alpha_{a,l}$ at a certain abscissa such as $x=0$, with $N \geq T+1$; and
  (ii) the set of exponent blinding factors $\alpha_{a,0}$, $\alpha_{a,1}, \ldots, \alpha_{a,L-1}$ for a given addition a are all elements of the multiplicative group $(Z/pZ)^x$ of integers modulo a prime number p;
(b) receiving a respective set of shares $[\rho^{-\lambda_a}]_n$, where:
  (i) $\rho$ is a public generator from the multiplicative group $(Z/pZ)^x$ of integers modulo p;
  (ii) $\lambda_a$ is a secret exponent which satisfies $$\lambda_a = \sum_{l=0}^{L-1} \alpha_{a,l}$$

(iii) the set of all the shares $[\rho^{-\lambda_a}]_n$ from the N computing nodes together represent shares of a degree-T polynomial that hide the secret value $\rho^{-\lambda}$ at a certain abscissa such as $x=0$;
(c) for each addition a comprising $M_a$ multiplications, receiving the same partition sets $P_{a,0}, P_{a,1}, \ldots, P_{a,M_a-1}$ of the indexing set $\{0, 1, \ldots, L-1\}$ such that all partition sets are disjoint and non-empty;

(d) computing, for each addition a, a set of shares $[\lambda_{a,0}]_n$, $[\lambda_{a,1}]_n, \ldots, [\lambda_{a,M_a-1}]_n$ according to:

$$[\lambda_{a,m}]_n = \sum_{l \in P_{a,m}} [\alpha_{a,l}]_n$$

for $m \in \{0, \ldots, M_a-1\}$, wherein for a given addition a and multiplication m the set of the shares $[\lambda_{a,m}]_n$ for $n \in \{0, 1, \ldots, N-1\}$ together represent shares of a degree-T polynomial that hide the secret dealer blinding factor $\lambda_{a,m}$ at a certain abscissa such as x=0;

(e) sending the respective share $[\lambda_{a,m}]_n$ for $a \in \{0, 1, \ldots, A-1\}$, $m \in \{0, 1, \ldots, M_a-1\}$, to the respective dealer node contributing the secret $s_{i_{a,m}}$ to the computation;

(f) receiving, from each dealer node contributing a secret $s_{i_{a,m}}$ to the computation, a particle $v_{a,m}$ wherein:

$$v_{a,m} = s_{i_{a,m}} \cdot \rho^{\lambda_{a,m}}$$

(g) calculating, for each addition $a \in \{0, 1, \ldots, A-1\}$, a share $[r_a]_n$ from a degree-T polynomial $r_a(x)$ where:

$$[r_a]_n = [\rho^{-\lambda_a}]_n \cdot \prod_{m=0}^{M_a-1} v_{a,m}$$

(h) calculating a result share $[r]_n$ from a degree-T polynomial $r(x)$ where:

$$[r]_n = \sum_{a=0}^{A-1} [r_a]_n$$

(i) sending to one or more result node(s) their result share $[r]_n$ whereby the result node(s) may reconstruct the evaluation $r(0)$ of polynomial $r(x)$ from the received result shares $[r]_n$, said evaluation $r(0)$ being equal to the result of said arithmetic function $f$.

There is also provided a computing system comprising a processor programmed to operate as a computing node in a computer-implemented method, carried out between a plurality of D dealer nodes and N computing nodes, for use in calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$, $m \in \{0, 1, \ldots, M_a-1\}$ identify private input secrets from the set of S secrets, and where the S secrets are selected from integers, real numbers or complex numbers, and each secret $s_{i_{a,m}}$ is known to one of said dealer nodes, wherein the processor is programmed with instructions causing the computing system to operate as the n-th computing node, $n \in \{0, 1, \ldots, N-1\}$ by:

(a) receiving a respective set of shares $[\alpha_{a,0}]_n$, $[\alpha_{a,1}]_n, \ldots, [\alpha_{a,L-1}]_n$, for every addition $a \in \{0, \ldots, A-1\}$ where L is a number chosen such that $L > M_a$, $\forall a \in \{0, 1, \ldots, A-1\}$ and $L > D$, and such that:

(i) the set of all the l-th shares $[\alpha_{a,l}]_n$, $l \in \{0, \ldots L-1\}$, from the N computing nodes together represent shares of a degree-T polynomial that hide a respective secret exponent blinding factor $\alpha_{a,l}$ at a certain abscissa such as x=0, with $N \geq T+1$; and (ii) the set of exponent blinding factors $\alpha_{a,0}, \alpha_{a,1}, \ldots, \alpha_{a,L-1}$ for a given addition a are all elements of the multiplicative group $(Z/pZ)^x$ of integers modulo a prime number p;

(b) receiving a respective set of shares $[\rho^{-\lambda_a}]_n$, where:
 (i) $\rho$ is a public generator from the multiplicative group $(Z/pZ)^x$ of integers modulo p;
 (ii) $\lambda_a$ is a secret exponent which satisfies $$\lambda_a = \sum_{l=0}^{L-1} \alpha_{a,l}$$

(iii) the set of all the shares $[\rho^{-\lambda_a}]_n$ from the N computing nodes together represent shares of a degree-T polynomial that hide the secret value $\rho^{-\lambda}$ at a certain abscissa such as x=0;

(c) for each addition a comprising $M_a$ multiplications, receiving the same partition sets $P_{a,0}, P_{a,1}, \ldots, P_{a,M_a-1}$ of the indexing set $\{0, 1, \ldots, L-1\}$ such that all partition sets are disjoint and non-empty;

(d) computing, for each addition a, a set of shares $[\lambda_{a,0}]_n$, $[\lambda_{a,1}]_n, \ldots, [\lambda_{a,M_a-1}]_n$ according to:

$$[\lambda_{a,m}]_n = \sum_{l \in P_{a,m}} [\alpha_{a,l}]_n$$

for $m \in \{0, \ldots, M_a-1\}$, wherein for a given addition a and multiplication m the set of the shares $[\lambda_{a,m}]_n$ for $n \in \{0, 1, \ldots, N-1\}$ together represent shares of a degree-T polynomial that hide the secret dealer blinding factor $\lambda_{a,m}$ at a certain abscissa such as x=0;

(e) sending the respective share $[\lambda_{a,m}]_n$ for $a \in \{0, 1, \ldots, A-1\}$, $m \in \{0, 1, \ldots, M_a-1\}$, to the respective dealer node contributing the secret $s_{i_{a,m}}$ to the computation;

(f) receiving, from each dealer node contributing a secret $s_{i_{a,m}}$ to the computation, a particle $v_{a,m}$ wherein:

$$v_{a,m} = s_{i_{a,m}} \cdot \rho^{\lambda_{a,m}}$$

(g) calculating, for each addition $a \in \{0, 1, \ldots, A-1\}$, a share $[r_a]_n$ from a degree-T polynomial $r_a(x)$ where:

$$[r_a]_n = [\rho^{-\lambda_a}]_n \cdot \prod_{m=0}^{M_a-1} v_{a,m}$$

(h) calculating a result share $[r]_n$ from a degree-T polynomial $r(x)$ where:

$$[r]_n = \sum_{a=0}^{A-1} [r_a]_n$$

(i) sending to one or more result node(s) their result share $[r]_n$ whereby the result node(s) may reconstruct the evaluation $r(0)$ of polynomial $r(x)$ from the received result shares $[r]_n$, said evaluation $r(0)$ being equal to the result of said arithmetic function $f$.

In addition to the computer program product and computing system detailed above relating to the computing node, a computer program product and computing system is similarly provided relating to the dealer node, each being defined by the method steps required to operate the dealer node functionality of the computer-implemented method detailed earlier in this section. There is further provided a distributed computing system comprising one or more dealer node computing systems and one or more computing node computing systems.

In another independent aspect there is provided a computer-implemented method, carried out between a dealer node and N computing nodes, for use in calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$, $m \in \{0, 1, \ldots, M_a-1\}$ identify private input secrets from the set of S secrets, and where the S secrets are selected from integers, real numbers or complex numbers, wherein the method comprises:

(j) the dealer node computing, for each addition $a \in \{0, 1, \ldots, A-1\}$ and each multiplication $m \in \{0, 1, \ldots, M_a-1\}$, a random dealer blinding factor $\lambda_{a,m}$;

(k) the dealer node computing, for each addition $a \in \{0, \ldots, A-1\}$:

$$\lambda_a = \sum_{m=0}^{M_a-1} \lambda_{a,m}$$

(l) the dealer node computing, for each addition $a \in \{0, \ldots, A-1\}$, N shares $[\rho^{-\lambda_a}]_0$, $[\rho^{-\lambda_a}]_1$, \ldots, $[\rho^{-\lambda_a}]_{N-1}$ of a degree-T polynomial that hides the value $\rho^{-\lambda_a}$ at a certain abscissa such as $x=0$;

(m) the dealer node computing, for each addition $a \in \{0, 1, \ldots, A-1\}$ and each multiplication $m \in \{0, 1, \ldots, M_a-1\}$, a respective particle $v_{a,m}$ where:

$$v_{a,m} = s_{i_{a,m}} \cdot \rho^{\lambda_{a,m}}$$

(n) the dealer node communicating, to each computing node n, $n \in \{0, 1, \ldots, N-1\}$:

(i) $\{v_{a,m}\}_{a \in \{0, \ldots, A-1\}, m \in \{0, \ldots, M_a-1\}}$, (ii) $\{[\rho^{-\lambda_a}]_n\}_{a \in \{0, \ldots, A-1\}}$;

(o) each computing node calculating, for each addition $a \in \{0, 1, \ldots, A-1\}$, a share $[r_a]_n$ from a degree-T polynomial $r_a(x)$ where:

$$[r_a]_n = [\rho^{-\lambda_a}]_n \cdot \prod_{m=0}^{M_a-1} v_{a,m}$$

(p) each computing node calculating a result share $[r]_n$ from a degree-T polynomial $r(x)$ where:

$$[r]_n = \sum_{a=0}^{A-1} [r_a]_n$$

(q) each computing node sending to one or more result node(s) their result share $[r]_n$, whereby the result node(s) may reconstruct the evaluation $r(0)$ of polynomial $r(x)$ from the received result shares $[r]_n$, said evaluation $r(0)$ being equal to the result of said arithmetic function $f$.

Preferably:

i. steps (d) and (e) are performed in a plurality of E execution stages, comprising a first execution stage and E−1 subsequent execution stages;

ii. the set of S private input secrets is partitioned into E disjoint sets corresponding to said E execution stages;

iii. the particles $v_{a,m}$ computed in step (d) and communicated in step (e) are computed in each execution stage for the secrets of the disjoint set corresponding to the execution stage; and iv. the computing nodes calculate the shares share $[r_a]_n$ in step (f) after all of the required particles $v_{a,m}$ have been received following said repeated execution stages.

Preferably, the communication to the computing nodes of $\{[\rho^{-\lambda_a}]_n\}_{a \in \{0, \ldots, A-1\}}$ occurs only in one execution stage.

Further, preferably, the communication to the computing nodes of $\{[\rho^{-\lambda_a}]_n\}_{a \in \{0, \ldots, A-1\}}$ occurs in the first execution stage.

Preferably, the partitioning of the secret variables is performed according to an index e corresponding with the execution stage, wherein the addition and multiplication subindices $a \in \{0, 1, \ldots, A-1\}$, $m \in \{0, 1, \ldots, M_a-1\}$ are partitioned such that:

$$\{0, \ldots, A-1\} = \bigcup_{e=1}^{E} A_e$$

$$\{0, \ldots, M_a-1\} = \bigcup_{e=1}^{E} M_{a,e}$$

where $A_e$ and $M_{a,e}$ represent, respectively, the indices of the additions and multiplications in each addition to which the dealer node contributes with input secret variables during the e-th execution stage.

Preferably, in the first execution stage (e=1) the dealer node computes in step (d) and communicates in step (e) the particles $v_{a,m} = s_{i_{a,m}} \cdot \rho^{\lambda_{a,m}}$ for $a \in A_1$, $m \in M_{a,1}$.

Preferably, in each subsequent execution stage e, the dealer node computes in step (d) and communicates in step (e) the particles $v_{a,m} = s_{i_{a,m}} \cdot \rho^{\lambda_{a,m}}$ for $a \in A_e$, $m \in M_{a,e}$.

Preferably, in the first execution stage, the dealer node stores to a readable memory the random dealer blinding factors $\lambda_{a,m}$, for each addition and multiplication not used in the first execution.

Preferably, in in each subsequent execution stage, the dealer node retrieves from said readable memory the random dealer blinding factors $\lambda_{a,m}$ required for the additions and multiplications involved in that subsequent execution stage.

Preferably, step (d) further comprises sending to each computing node:

$$\{[\lambda_{a,m}]_n\}_{a \in \{0, \ldots, A-1\}, m \in \{0, \ldots, M_a-1\}}$$

Preferably, the method further comprises the computing nodes sending back to the dealer node, for a given value of a, m, the values $v_{a,m}$, $\{[\lambda_{a,m}]_n\}_{n \in \{0, \ldots, N-1\}}$, and the dealer node reconstructing $\lambda_{a,m}$ and recovering the secret input $s_{i_{a,m}}$ from the corresponding particle $v_{a,m}$.

According to this aspect there is also provided a non-transitory computer program product comprising instructions which, when executed by a processor, cause the processor to operate as a dealer node in a computer-implemented method, carried out between the dealer node and N computing nodes, for use in calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$ $m \in \{0, 1, \ldots, M_a-1\}$ identify private input secrets from the set of S secrets, and where the S secrets are selected from integers, real numbers or complex numbers, wherein the instructions cause the processor to:
(a) compute, for each addition $a \in \{0, 1, \ldots, A-1\}$ and each multiplication m E $\{0, 1, \ldots, M_a-1\}$, a random dealer blinding factor $\lambda_{a,m}$;
(b) compute, for each addition $a \in \{0, \ldots, A-1\}$:

$$\lambda_a = \sum_{m=0}^{M_a-1} \lambda_{a,m}$$

(c) compute, for each addition $a \in \{0, \ldots, A-1\}$, N shares $[\rho^{-\lambda_a}]_0, [\rho^{-\lambda_a}]_1, \ldots, [\rho^{-\lambda_a}]_{N-1}$ of a degree-T polynomial that hides the value $\rho^{-\lambda_a}$ at a certain abscissa such as x=0;
(d) compute, for each addition $a \in \{0, 1, \ldots, A-1\}$ and each multiplication m E $\{0, 1, \ldots, M_a-1\}$, a respective particle $v_{a,m}$ where $v_{a,m} = s_{i_{a,m}} \cdot \rho^{\lambda_{a,m}}$; and
(e) communicate, to each computing node n, $n \in \{0, 1, \ldots, N-1\}$:
  i. $\{v_{a,m}\}_{a \in \{0, \ldots, A-1\}, m \in \{0, \ldots, M_a-1\}}$,
  ii. $\{[\rho^{-\lambda_a}]_n\}_{a \in \{0, \ldots, A-1\}}$ There is further provided a computing system comprising a processor programmed to operate as a dealer node in a computer-implemented method, carried out between the dealer node and N computing nodes, for use in calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$ $m \in \{M, 1, \ldots, M_a-1\}$ identify private input secrets from the set of S secrets, and where the S secrets are selected from integers, real numbers or complex numbers, wherein the instructions cause the processor to:
(a) compute, for each addition $a \in \{0, 1, \ldots, A-1\}$ and each multiplication m E $\{0, 1, \ldots, M_a-1\}$, a random dealer blinding factor $\lambda_{a,m}$;
(b) compute, for each addition $a \in \{0, \ldots, A-1\}$:

$$\lambda_a = \sum_{m=0}^{M_a-1} \lambda_{a,m}$$

(c) compute, for each addition $a \in \{0, \ldots, A-1\}$, N shares $[\rho^{-\lambda_a}]_0, [\rho^{-\lambda_a}]_1, \ldots, [\rho^{-\lambda_a}]_{N-1}$ of a degree-T polynomial that hides the value $\rho^{-\lambda_a}$ at a certain abscissa such as x=0;
(d) compute, for each addition $a \in \{0, 1, \ldots, A-1\}$ and each multiplication m E $\{0, 1, \ldots, M_a-1\}$, a respective particle $v_{a,m}$ where $v_{a,m} = s_{i_{a,m}} \cdot \rho^{\lambda_{a,m}}$; and
(e) communicate, to each computing node n, $n \in \{0, 1, \ldots, N-1\}$:
  i. $\{v_{a,m}\}_{a \in \{0, \ldots, A-1\}, m \in \{0, \ldots, M_a-1\}}$,
  ii. $\{[\rho^{-\lambda_a}]_n\}_{a \in \{0, \ldots, A-1\}}$ In addition to the computer program product and computing system detailed above relating to the dealer node in this aspect, a computer program product and computing system is similarly provided relating to the computing nodes, each being defined by the method steps required to operate the computing node functionality of the computer-implemented method of this aspect. There is further provided a distributed computing system comprising a dealer node computing system and one or more computing node computing systems.

BRIEF DESCRIPTION OF THE DRAWINGS

Embodiments of the invention will now be described, by way of example only, with reference to the accompanying schematic drawings, in which.

DETAILED DESCRIPTION OF PREFERRED EMBODIMENTS

Figure 1:
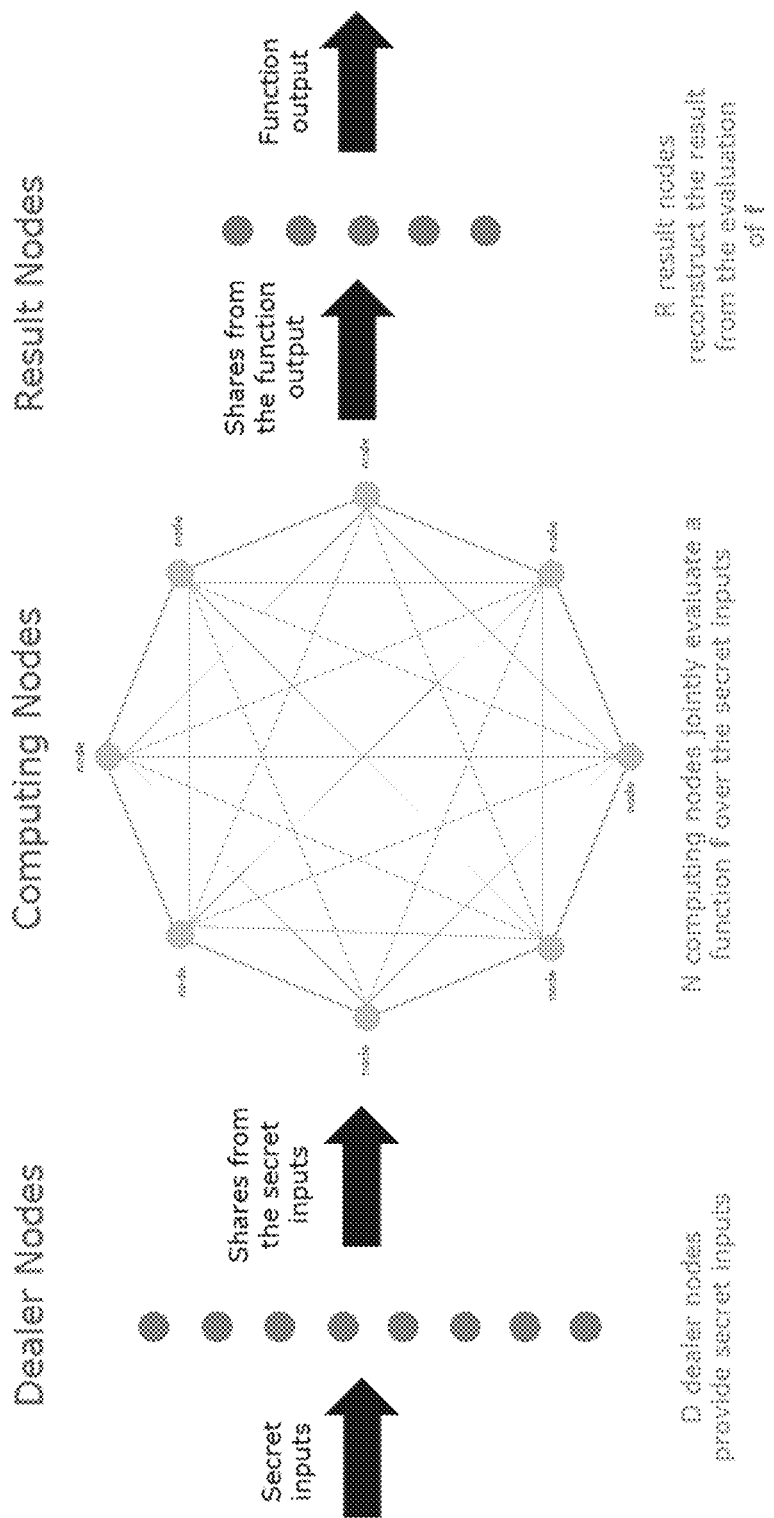
FIG. 1 shows a generic SMPC setup.
Figure 2:
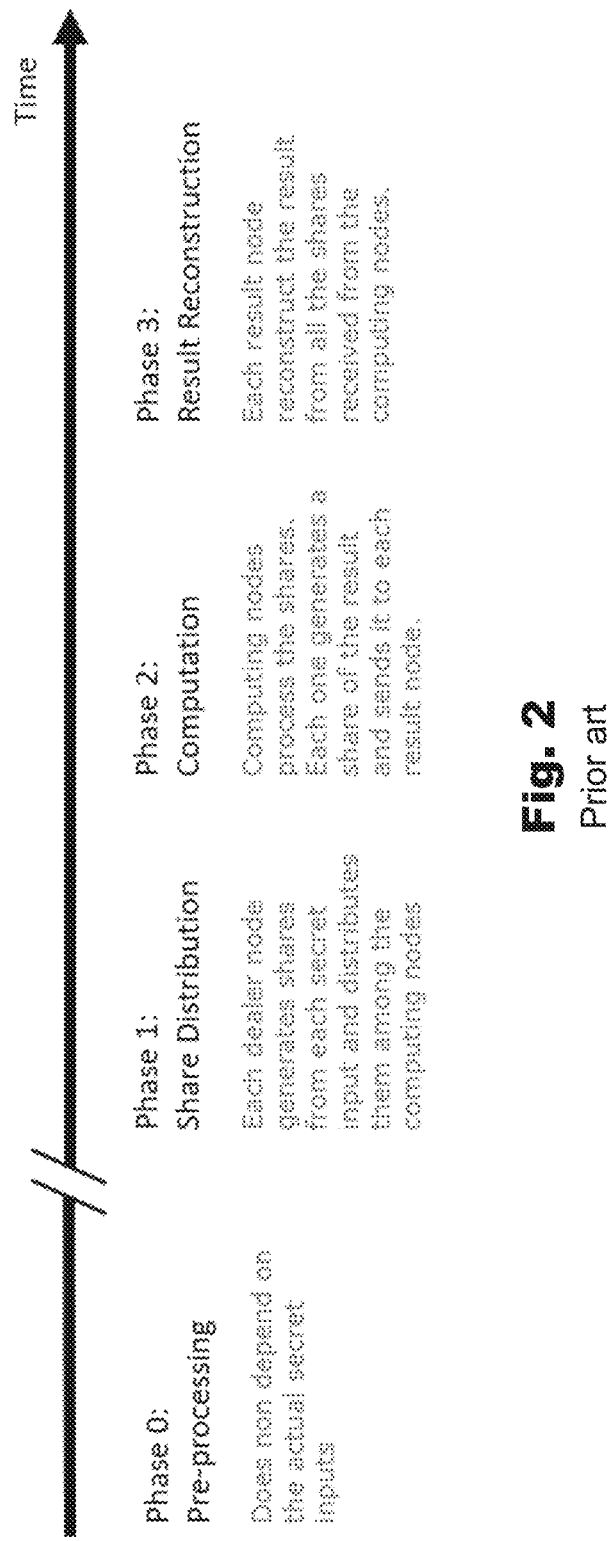
FIG. 2 illustrates the four phases of a generic SMPC protocol using LSS.

The focus of the embodiments is on the evaluation with SMPC of any function in the arithmetic setting. In the arithmetic setting, a function can be represented without loss of generality as the sum of groups of secret products. In this setting, secrets are natural, integer, real or complex numbers.

The evaluation of a general function requires the computation of products in the arithmetic setting. State-of-the-art SMPCs require nodes to exchange messages in order to jointly evaluate arithmetic products. The exchange of messages is many orders of magnitude slower than computations on a local CPU. This is the reason why the jointly evaluation of nontrivial functions in standard SMPCs is orders of magnitude slower than on a centralized server.

In this invention we present a new protocol called MLC (Messageless Compute) which can evaluate any function in the arithmetic setting without the computing nodes having to exchange any message during the computation phase (Phase 2). MLC therefore removes the main performance problem from standard SMPC and it is capable of evaluating nontrivial functions over a large number of private inputs and using a large number of computing nodes in essentially the same time as it takes in a centralized computation where all information is available in clear inside of a single server. MLC as presented in this invention is secure against passive and active adversaries:

Passive adversaries follow the protocol specification but try to learn information about the private inputs $s_0, s_1, \ldots, s_{S-1}$ to the computation.

Active adversaries may deviate from the protocol to try to learn information about the private inputs, to alter the result from a computation, or simply to prevent the computation from taking place. Active adversaries may therefore change the content of their messages, delay their messages or simply not send them.

The MLC protocol in the passive and active adversary settings requires a pre-processing phase. In this invention we describe the output of this phase and assume that it is carried out by a trusted third party.

We focus on the arithmetic setting and on functions returning only one number. We refer to Appendix A.3 of SPDZ [SPDZ12], which is incorporated herein by reference, for a description on how to extend this to any number of output values. Without loss of generality, this function can be expressed as the addition of A groups of multiplications of secrets:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is a number resulting from the product of $M_a$ private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

$i = 3$

Here, the subindices $i_{a,m}$ for $a \in \{0, 1, \ldots, A-1\}$, $m \in \{0, 1, \ldots, M_a-1\}$ are indexing private input secrets from the set of all S secrets $\{s_0, s_1, \ldots, s_{S-1}\}$. The S secrets may be integers, real or even complex numbers. They come from different Dealer Nodes who wish to keep them private and yet to use them as inputs to the joint evaluation of $f$. In what follows, we make the following assumptions:

Assumption 1: There are private point-to-point channels between different nodes in the network.

Assumption 2: There is an authenticated broadcast channel

Assumption 3: Without loss of generality, we assume that for every addition term $m_a$ there is at most only one input per dealer, since if a dealer contributes with more than one input variable to the product $m_a$, it can always replace them with a new input variable equal to their product.

Assumption 4: We work with finite field arithmetic Z/pZ. That is, secrets are all represented as integers modulo p, where p is a prime number. All the computations that follow are therefore performed modulo p, represented as mod p. For simplicity we will omit mod p.

The arithmetic function then be expressed more succinctly as:

$$f = f(s_0, s_1, \ldots, s_{S-1}) = \sum_{a=0}^{A-1} \prod_{m=0}^{M_a-1} s_{i_{a,m}} \qquad \text{Eq. 1}$$

We refer to the D-MLC protocol to an implementation for D Dealer Nodes. We distinguish between active and passive adversary settings. We proceed as follows:

First, we describe in section 1 the pre-processing phase as an ideal functionality that is executed by a trusted third party, specifying its inputs and outputs.

Second, we present in section 2 D-HLC in the passive adversary setting,

Third we introduce in section 3 D-HLC in the active adversary setting, and

Finally, we present in section 4 a special case of the D-HLC algorithm in the active setting for D=1 (i.e. there is only one dealer).

Section 1: Pre-Processing as an Ideal Functionality

The goal of the pre-processing phase is to compute some randomness and to distribute shares of that randomness to the Computing Nodes. The randomness is used for:

The computation of multiplications by the Computing Nodes without the need to communicate, and The creation of a so-called particle to hide the information from the input variables contributed by every Dealer Node.

The idea is that the pre-processing takes place before we know how many dealers there will be involved in a computation, or how many multiplications the computation will comprise. Therefore, a key requirement for the pre-processing phase is that it should be de-coupled from the number of dealers and from the number of multiplications to be computed. To achieve this, the pre-processing phase relies on a vector of fine-granular randomness that we call the exponent blinding factors and represent by $\alpha_0, \alpha_1, \ldots, \alpha_{L-1}$. The assumption is that L is larger than the maximum number of multiplications and larger than the maximum number Dealer Nodes in a computation.

The pre-processing phase comprises several executions (possibly in parallel) of the following pre-processing ideal functionality $F_{pre}$ run by a trusted node:
Algorithm: Pre-Processing Ideal Functionality $F_{pre}$
Inputs:
  L: The number of exponent blinding factors to generate,
  N: The number of Computing Nodes in the MLC Network
  p: A prime number
  ρ: A public generator from the multiplicative group $(Z/pZ)^x$ of integers modulo p
  $x_0, \ldots, x_{N-1}$ pre-agreed public abscissa for each one of the N MLC Computation Nodes, and
  T: Degree of the Shamir polynomials
Output:
  Each Computing Node receives:
    Polynomial shares $[\alpha_0], [\alpha_1], \ldots, [\alpha_{L-1}]$ from each exponent blinding factor $\alpha_0, \alpha_1, \ldots, \alpha_{L-1}$, and
    A polynomial share $[\rho^{-\lambda}]$ of $\rho^{-\lambda}$, where:

$$\lambda = \sum_{m=0}^{L-1} \alpha_m \qquad \text{Eq. 2}$$

Purpose:
  A trusted node generates and sends the required randomness to the MLC Computing Nodes so that they are able to process arithmetic operations without the need for inter-node communication.
Security Requirement:
  The exponent blinding factors $\alpha_0, \alpha_1, \ldots, \alpha_{L-1}$, and $\rho^{-\lambda}$ are internal secrets that the trusted node does not reveal to anyone.
Algorithm Steps:
  The following steps are executed by the trusted node:
  Step 1: Computation of the exponent blinding factors.
    Compute L random exponent blinding factors $\alpha_0, \alpha_1, \ldots, \alpha_{L-1} \in (Z/pZ)^x$
  Step 2: Computation of shares.
    For every exponent blinding factor $m \in \{0, \ldots L-1\}$ compute N shares of a degree-T polynomial that hides the value $\alpha_m$ at x=0:

$[\alpha_m]_0, [\alpha_m]_1, \ldots, [\alpha_m]_{N-1} \leftarrow \text{SHAMIR}(\alpha_m)$ Step 3: Computation of $\rho^{-\lambda}$.
    Compute $\rho^{-\lambda}$, where $$\lambda = \sum_{m=0}^{L-1} \alpha_m$$

Step 4: Computation of shares.
    Compute N shares of a degree-T polynomial that hides the value $\rho^{-\lambda}$ at x=0:

$[\rho^{-\lambda}]_0, [\rho^{-\lambda}]_1, \ldots, [\rho^{-\lambda}]_{N-1} \leftarrow \text{SHAMIR}(\rho^{-\lambda})$ For each $n \in \{0, \ldots, N-1\}$, the trusted node then sends to the n-th node:
      $[\alpha_0]_n, [\alpha_1]_n, \ldots, [\alpha_{L-1}]_n$, and
      $[\rho^{-\lambda}]_n$
    [End of Algorithm: Pre-processing Ideal Functionality $F_{pre}$]

Section 2: Passive D-MLC
  In a first implementation, there is provided a method to evaluate an arithmetic function, the method being described and illustrated below with the algorithm Passive D-MLC.
  We now define the three phases of the Passive D-MLC to evaluate any arithmetic function. Without loss of generality, this function will comprise A additions and $M_a$ multiplication factors in the a-th addition. This means that $M_a$ Dealer Nodes will contribute $M_a$ secrets as multiplication factors to the a-th addition term.
  The idea is that the MLC Computation Nodes follow the same pre-agreed deterministic algorithm to create a partition of the set $\{0, 1, \ldots, L-1\}$ into $M_a$ disjoint, non-empty sets. That is, $\{0, 1, \ldots, L-1\} = P_{a,0} \cup P_{a,1} \cup \ldots \cup P_{a,M_a-1}$. This partition dictates which exponent blinding factors need to be added in order to produce what we call a dealer blinding factor $\lambda_{a,m}$. This blinding factor will be used by the Dealer Node to create a particle that masks its input to the m-th multiplication factor in the a-th addition.
  To formalize this idea, let us denote:

$$P_{a,0}, P_{a,1}, \ldots, P_{a,M_a-1} \leftarrow \text{PARTITION}(L, M_a)$$

to the deterministic algorithm that creates a partition of the indexing set $\{0, 1, \ldots, L-1\}$ with $M_a$ sets such that all partition sets are disjoint and non-empty. An example of such deterministic algorithm is the following:
Algorithm: PARTITION (L, M)
  IF (L<M) THEN RETURN ERROR
  IF (L==M) THEN RETURN $P_0, P_1, \ldots, P_{M-1}$ with $P_i=\{i\}$
  Perform integer division L/M and obtain integer quotient Q and remainder R
  Split vector $\{0, 1, \ldots, L-1\}$ into M subsets $P_0, P_1, \ldots, P_{M-1}$ of equal size Q
  Add the R remaining unassigned elements in $\{0, 1, \ldots, L-1\}$ to the last partition set $P_{M-1}$.
  RETURN $P_0, P_1, \ldots, P_{M-1}$
  [End of Algorithm: Pre-processing Ideal Functionality $F_{pre}$]
  For example, on inputs L=4 and M=3, this algorithm returns $P_0=\{0\}, P_1=\{1\}, P_2=\{2,3\}$. The particular choice of algorithm is irrelevant as long as the partition sets are disjoint and non-empty, and every MLC Computation Node executes the same partition algorithm. The skilled person will readily appreciate that they can use any arbitrary set of rules to allocate L integers into $M_a$ disjoint, non-empty partition sets.
  Once computed, the partition $P_{a,0}, P_{a,1}, \ldots, P_{a,M_a-1}$ allows us to define the m-th "dealer blinding factor" as:

$$\lambda_{a,m} = \sum_{i \in P_{a,m}} \alpha_{a,i} \qquad \text{Eq. 3}$$

Notice that since the partition sets are non-empty, every $\lambda_{a,m}$ is well-defined.
Notice also that since the partition sets are disjoint the following equation holds:

$$\lambda_a = \sum_{m=0}^{M_a-1} \lambda_{a,m} = \sum_{l=0}^{L-1} \alpha_{a,l}$$

where $\lambda_a$ is the same A defined in Eq. 2.
In what follows, we assume that the MLC Computing Nodes have run the pre-processing phase. Specifically, we assume that each n-th MLC Computing Node has obtained the following shares for every addition $a \in \{0, \ldots, A-1\}$:

$[\alpha_{a,0}]_n, [\alpha_{a,1}]_n, \ldots, [\alpha_{a,L-1}]_n$, and
$[\rho^{-\lambda_a}]_n$ Algorithm: Passive D-MLC Inputs:
D Dealer Nodes, whereby the n-th node holds a subset $S_n$ of the total set of secrets $S=\{s_0, s_1, \ldots, s_{S-1}\}$. The Dealer Nodes wish to compute an arithmetic function $f=f(s_0, s_1, \ldots, s_{S-1})$ over their secrets given by Eq. 1. Additional inputs follow:

N=T+1: The number of Computing Nodes in the MLC Network, where T is the degree of the Shamir polynomials p: A prime number $\rho$: A public generator from the multiplicative group $(Z/pZ)^x$ of integers modulo p $x_0, \ldots, x_{N-1}$ pre-agreed public abscissa for each one of the N MLC Computation Nodes used Output:
R result nodes reconstruct the function result $f = \sum_{a=0}^{A-1} \prod_{m=0}^{M_a-1} s_{i_{a,m}}$ comprising A additions, whereby the a-th addition comprises $M_a$ multiplications. This function is evaluated by N computing nodes that are not able to see any of the input secrets.

Purpose:
N computing nodes can jointly evaluate any arithmetic function whilst keeping the dealers' secrets private and without any message exchange during the computation phase.

Algorithm Steps:
The steps of the algorithm can be divided into three phases: Share Distribution, Computation and Result Reconstruction.

Phase 1—Share Distribution
Step 1:
For every addition $a \in \{0, \ldots, A-1\}$, each MLC Computing Node "n":
Runs the partition algorithm and independently obtains the same partition sets $P_{a,0}, P_{a,1}, \ldots, P_{a,M_a-1} \leftarrow \text{PARTITION}(L, M_a)$ Locally computes a share from each dealer blinding factor $[\lambda_{a,m}]_n$ from the shares of the exponent blinding factors $[\alpha_{a,i}]_n$ and the partition sets $P_{a,0}, P_{a,1}, \ldots, P_{a,M_a-1}$ as follows:

$$[\lambda_{a,m}]_n = \sum_{i \in P_{a,m}} [\alpha_{a,i}]_n$$

for $m \in \{0, \ldots, M_a-1\}$.

Sends their share $[\lambda_{a,m}]_n$ to Dealer Node $d \in \{0, 1, \ldots, D-1\}$ if this Dealer Node contributes with secret $s_{i_{a,m}}$ to the computation, for every addition $a \in \{0, \ldots, A-1\}$ and every multiplication $m \in \{0, \ldots, M_a-1\}$. Messages to the same Dealer Node can be merged into one single message.

Step 2:
Each Dealer Node $d \in \{0, 1, \ldots, D-1\}$ receives the shares $[\lambda_{a,m}]_n$, $n \in \{0, \ldots, N-1\}$ from the previous step if they contribute with secret $s_{i_{a,m}}$ to the computation of the multiplication comprising the a-th addition term in Eq. 1. This node reconstructs $\lambda_{a,m}$ using polynomial interpolation:

$\lambda_{a,m} \leftarrow \text{INTERPOLATE}([\lambda_{a,m}]_0, [\lambda_{a,m}]_1, \ldots, [\lambda_{a,m}]_T)$ Recall that in $s_{i_{a,m}}$, $i_{a,m}$ acts as an index to the corresponding secret in the set $s_0, s_1, \ldots, s_{S-1}$. Recall also from Assumption 3 that each Dealer Node only contributes with at most one secret to the a-th addition term in Eq. 1.

Step 3:
Each Dealer Node then computes the particle $v_{a,m}$ from their secret input $s_{i_{a,m}}$ using the dealer blinding factor $\lambda_{a,m}$ as follows:

$v_{a,m} = s_{i_{a,m}} \cdot \rho^{\lambda_{a,m}}$

Step 4:
Each Dealer Node sends one broadcast message to the N computing nodes containing one value $v_{a,m}$ for each addition term a to which they contribute a secret. Each value $v_{a,m}$ represents an MLC particle computed from their secret $s_{i_{a,m}}$.

Note on security. Notice that unless all N computing nodes were colluding, they would not know the value of the dealer blinding factors $\lambda_{a,m}$ because all they have is a Shamir polynomial share of these values. Therefore, the factor $\rho^{\lambda_{a,m}}$ is effectively hiding the secret value $s_{i_{a,m}}$ and algorithm MLC inherits the security features from SSS in the passive setup, namely, it is secure against T (or less) colluding nodes. Specifically, an adversary would have to corrupt all T+1 computing nodes in order to be able to reconstruct $\lambda_{a,m}$ and recover $s_{i_{a,m}}$ from $v_{a,m}$.

Phase 2—Computation
Step 1:
Each computing node n, $n \in \{0, 1, \ldots, N-1\}$ calculates for each addition a, $a \in \{0, 1, \ldots, A-1\}$ a share from a degree-T polynomial $r_a(x)$ which is a scaled version of the polynomial hiding $\rho^{-\lambda_a}$ as a secret:

$$[r_a]_n = [\rho^{-\lambda_a}]_n \cdot \prod_{m=0}^{M_a-1} v_{a,m} \qquad \text{Eq. 4}$$

Notice that $\prod_{m=0}^{M_a-1} v_{a,m}$ is just a scalar and so $r_a(x)$ has the same degree-T as the polynomial hiding $\rho^{-\lambda_a}$ as a secret.

Step 2:
Each computing node n, $n \in \{0, 1, \ldots, N-1\}$ calculates a share $[r]_n$ from a degree-T polynomial $\sum_{a=0}^{A-1} r_a(x)$:

$$[r]_n = \sum_{a=0}^{A-1} [r_a]_n \qquad \text{Eq. 5}$$

This phase does not require any communication between the computing nodes since each node n can locally compute $[r_a]_n$ for each $a \in \{0, 1, \ldots, A-1\}$.

Phase 3—Result Reconstruction
Each computing node n, $n \in \{0, 1, \ldots, N-1\}$ sends their MLC share $[r]_n$ of the result to the result nodes, which apply Lagrange interpolation to reconstruct the evaluation r(0) of polynomial r(x), which is equal to the output of the function we wanted to evaluate:

$f = r(0) \leftarrow \text{INTERPOLATE}([r]_0, [r]_1, \ldots, [r]_T)$ \qquad Eq. 6

[End of Algorithm::Passive D-MLC]

Figure 3:
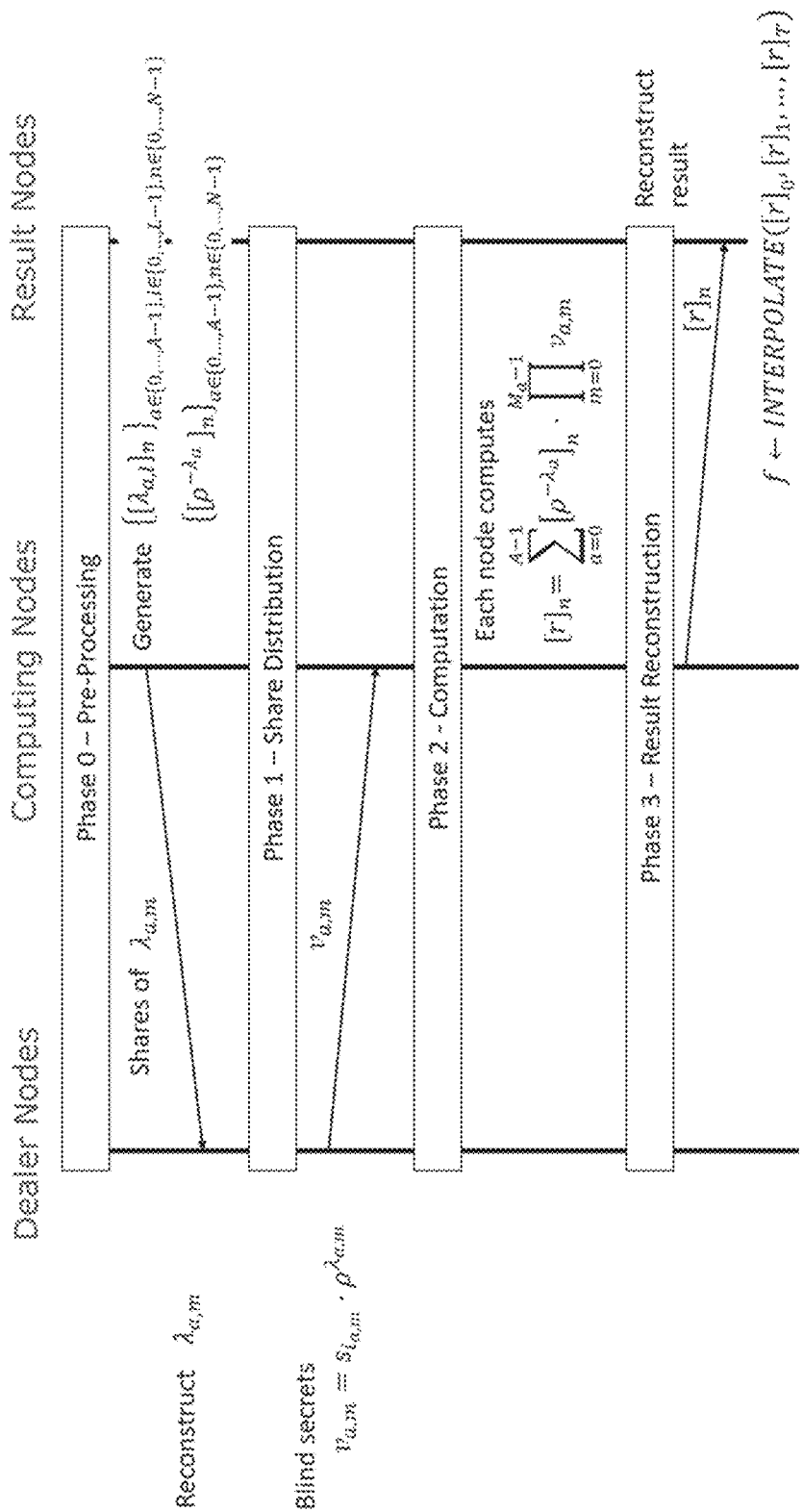
FIG. 3 is a flowchart of the message flows involved in Passive D-MLC, according to an embodiment of the invention.

FIG. 3 is a flowchart of the message flows involved in Passive D-MLC. As it can be appreciated, the computation phase requires no message exchange among the computing nodes. Each one independently compute (see Eq. 4):

$$[r]_n = \sum_{a=0}^{A-1} [\rho^{-\lambda_a}]_n \cdot \prod_{m=0}^{M_a-1} v_{a,m}$$

Proof for Eq. 6.

Now we provide a proof for the main result in Eq. 6. Starting from Eq. 4 and 5 we have:

$$[r]_n = \sum_{a=0}^{A-1} [r_a]_n =$$

$$\sum_{a=0}^{A-1} [\rho^{-\lambda_a}]_n \cdot \prod_{m=0}^{M_a-1} v_{a,m} =$$

$$\sum_{a=0}^{A-1} [\rho^{-\lambda_a}]_n \cdot \prod_{m=0}^{M_a-1} s_{i_{a,m}} \cdot \rho^{\lambda_{a,m}} =$$

$$\sum_{a=0}^{A-1} \rho^{\lambda_{a,0}} \cdot \rho^{\lambda_{a,1}} \cdot \ldots \cdot \rho^{\lambda_{a,M_a-1}} \cdot [\rho^{-\lambda_a}]_n \cdot \prod_{m=0}^{M_a-1} s_{i_{a,m}} =$$

$$\sum_{a=0}^{A-1} \rho^{\lambda_{a,0}+\lambda_{a,1}+\ldots+\lambda_{a,M_a-1}} \cdot [\rho^{-\lambda_a}]_n \cdot \prod_{m=0}^{M_a-1} s_{i_{a,m}} =$$

$$\sum_{a=0}^{A-1} \rho^{\lambda_a} \cdot [\rho^{-\lambda_a}]_n \cdot \prod_{m=0}^{M_a-1} s_{i_{a,m}}$$

where the last step comes from the fact that $\lambda_{a,0}+\lambda_{a,1}+\ldots+\lambda_{a,M_a-1}=\lambda_a$, which follows from Eq. 2 and Eq. 3. By plugging this result into the right-hand side of Eq. 6 and taking into account Lagrange Interpolation for r(x) we get:

$$r(0) = \sum_{n=0}^{N-1} [r]_n \cdot \prod_{\substack{0 \le m \le N-1 \\ m \ne n}} \frac{x_m}{x_m - x_n} =$$

$$\sum_{n=0}^{N-1} \prod_{\substack{0 \le m \le N-1 \\ m \ne n}} \frac{x_m}{x_m - x_n} \sum_{a=0}^{A-1} \rho^{\lambda_a} \cdot [\rho^{-\lambda_a}]_n \cdot \prod_{m=0}^{M_a-1} s_{i_{a,m}} =$$

$$\sum_{a=0}^{A-1} \sum_{n=0}^{N-1} \prod_{\substack{0 \le m \le N-1 \\ m \ne n}} \frac{x_m}{x_m - x_n} \cdot \rho^{\lambda_a} \cdot [\rho^{-\lambda_a}]_n \prod_{m=0}^{M_a-1} s_{i_{a,m}} =$$

Rearranging terms:

$$r(0) = \sum_{a=0}^{A-1} \rho^{\lambda_a} \cdot \prod_{m=0}^{M_a-1} s_{i_{a,m}} \sum_{n=0}^{N-1} [\rho^{-\lambda_a}]_n \cdot \prod_{\substack{0 \le m \le N-1 \\ m \ne n}} \frac{x_m}{x_m - x_n}$$

where the inner sum corresponds to the Lagrange interpolation at x=0 of a degree-T polynomial that hides the value $\rho^{-\lambda_a}$ and it is therefore equal to this value:

$$\rho^{-\lambda_a} = \sum_{n=0}^{N-1} [\rho^{-\lambda_a}]_n \cdot \prod_{\substack{0 \le m \le N-1 \\ m \ne n}} \frac{x_m}{x_m - x_n}$$

Replacing this we obtain:

$$r(0) = \sum_{a=0}^{A-1} \rho^{\lambda_a} \cdot \rho^{-\lambda_a} \prod_{m=0}^{M_a-1} s_{i_{a,m}}$$

which corresponds to $f=f(s_0, s_1, \ldots, s_{S-1}) = \Sigma_{a=0}^{A-1} \Pi_{m=0}^{M_a-1} s_{i_{a,m}}$ in Eq. 1. ∎

Section 3: Active D-MLC

In a second independent aspect of the invention, there is provided a method to evaluate an arithmetic function, the method being described and illustrated below with the algorithm Active D-MLC.

We now define the four phases of the Active MLC to evaluate any arithmetic function. As in the passive case, the idea is that the MLC Computation Nodes follow the same pre-agreed deterministic algorithm to create a partition of the set $\{0, 1, \ldots, L-1\}$ into $M_a$ disjoint, non-empty sets. That is, $\{0, 1, \ldots, L-1\}=P_{a,0} \cup P_{a,1} \cup \ldots \cup P_{a,M_a-1}$. This partition dictates which exponent blinding factors need to be added in order to produce what we call a dealer blinding factor $\lambda_{a,m}$ for the Dealer Node contributing with the m-th multiplication factor in the a-th addition. We denote as before:

$$P_{a,0}, P_{a,1}, \ldots, P_{a,M_a-1} \leftarrow \text{PARTITION}(L, M_a)$$

to the deterministic algorithm that creates a partition of the indexing set $\{0, 1, \ldots, L-1\}$ into $M_a$ sets such that all partition sets are disjoint and non-empty. The same considerations apply as in the passive case regarding the nature of this algorithm.

As in the passive case, we assume that each MLC Computing Node has computed in the pre-processing phase the following shares for every addition $a \in \{0, \ldots, A-1\}$:

$$[\alpha_{a,0}]_n, [\alpha_{a,1}]_n, \ldots, [\alpha_{a,L-1}]_n, \text{ and}$$

$$[\rho^{-\lambda_a}]_n$$

An important difference compared to the passive case is that now there are N shares with N>T+1 (instead of T+1) from the degree-T polynomials hiding each one of the secrets above. The extra shares provide redundancy that will be used to detect and correct wrong shares that the corrupted parties might deliver for the reconstruction of a secret. A typical setup is to choose N≥3T+1, which can allow for the detection and correction of up to T shares from T corrupted parties in the reconstruction of a secret.

Algorithm: Active D-MLC

Inputs:

D Dealer Nodes, whereby the n-th node holds a subset $S_n$ of the total set of secrets $S=\{s_0, s_1, \ldots, s_{S-1}\}$. The Dealer Nodes wish to compute an arithmetic function $f=f(s_0, s_1, \ldots, s_{S-1})$ over their secrets given by Eq. 1. Additional inputs follow:

N>T+1: The number of Computing Nodes in the MLC Network, where T is the degree of the Shamir polynomials p: A prime number ρ: A public generator from the multiplicative group $(Z/pZ)^x$ of integers modulo p $x_0, \ldots, x_{N-1}$ pre-agreed public abscissa for each one of the N MLC Computation Nodes used Output:
R result nodes reconstruct the function result $f=\Sigma_{a=0}^{A-1}\Pi_{m=0}^{M_a-1} s_{i_{a,m}}$ comprising A additions, whereby the a-th addition comprises $M_a$ multiplications. This function is evaluated by N computing nodes that are not able to see any of the input secrets.

Purpose:
N computing nodes can jointly evaluate any arithmetic function whilst keeping the dealers' secrets private and without any message exchange during the computation phase. A fraction of the nodes can be corrupted without compromising the correctness of the protocol.

Algorithm Steps:
The steps of the algorithm can be divided into three phases: Share Distribution, Computation and Result Reconstruction.

Phase 1—Share Distribution
Step 1:
For every addition $a \in \{0, \ldots, A-1\}$, each MLC Computing Node "n":
Runs the partition algorithm and independently obtains the same partition sets $$P_{a,0}, P_{a,1}, \ldots, P_{a,M_a-1} \leftarrow \text{PARTITION}(L, M_a)$$

Locally computes a share from each dealer blinding factor $[\lambda_{a,m}]_n$ from the shares of the exponent blinding factors $[\alpha_{a,i}]_n$ and the partition sets $P_{a,0}, P_{a,1}, \ldots, P_{a,M_a-1}$ as follows:

$$[\lambda_{a,m}]_n = \sum_{i \in P_{a,m}} [\alpha_{a,i}]_n$$

for $m \in \{0, \ldots, M_a-1\}$.
Sends their share $[\lambda_{a,m}]_n$ to Dealer Node $d \in \{0, 1, \ldots, D-1\}$ if this Dealer Node contributes with secret $s_{i_{a,m}}$ to the computation, for every addition $a \in \{0, \ldots, A-1\}$ and every multiplication $m \in \{0, \ldots, M_a-1\}$. Messages to the same Dealer Node can be merged into one single message.

Step 2:
Each Dealer Node $d \in \{0, 1, \ldots, D-1\}$ receives the shares $[\lambda_{a,m}]_n$ from the previous step if they contribute with secret $s_{i_{a,m}}$ to the computation of the multiplication comprising the a-th addition term in Eq. 1, and reconstructs $\lambda_{a,m}$ using error correction codes:

$$\lambda_{a,m} \leftarrow ECC([\lambda_{a,m}]_0, [\lambda_{a,m}]_1, \ldots, [\lambda_{a,m}]_{N-1})$$

Recall that in $s_{i_{a,m}}$, $i_{a,m}$ acts as an index to the corresponding secret in the set $s_0, s_1, \ldots, s_{S-1}$. Recall also from Assumption 3 that each Dealer Node only contributes with at most one secret to the a-th addition term in Eq. 1.

Step 3:
Each Dealer Node then computes the particle $v_{a,m}$ from their secret input $s_{i_{a,m}}$ using the dealer blinding factor $\lambda_{a,m}$ as follows:

$$v_{a,m} = s_{i_{a,m}} \cdot \rho^{\lambda_{a,m}}$$

Step 4:
Each Dealer Node sends one broadcast message to the N computing nodes containing one value $v_{a,m}$ for each addition term a to which they contribute a secret. Each value $v_{a,m}$ represents an MLC particle computed from their secret $s_{i_{a,m}}$.

Note on security. Notice that T+1 nodes are required to collude to reconstruct the value of the dealer blinding factors $\lambda_{a,m}$ because all they have is a degree-T Shamir polynomial share of these values. Therefore, the factor $\rho^{\lambda_{a,m}}$ is effectively hiding the secret value $s_{i_{a,m}}$ and algorithm MLC inherits the security features from SSS in the passive setup, namely, it is secure against T (or less) colluding nodes.

Phase 2—Computation
Step 1:
Each computing node n, $n \in \{0, 1, \ldots, N-1\}$ calculates for each addition a, $a \in \{0, 1, \ldots, A-1\}$ a share from a degree-T polynomial $r_a(x)$ which is a scaled version of the polynomial hiding $\rho^{-\lambda_a}$ as a secret:

$$[r_a]_n = [\rho^{-\lambda_a}]_n \cdot \prod_{m=0}^{M_a-1} v_{a,m} \qquad \text{Eq. 4}$$

Notice that $\prod_{m=0}^{M_a-1} v_{a,m}$ is just a scalar and so $r_a(x)$ has the same degree-T as the polynomial hiding $\rho^{-\lambda_a}$ as a secret.

Step 2:
Each computing node n, $n \in \{0, 1, \ldots, N-1\}$ calculates a share from a degree-T polynomial $r(x) = \Sigma_{a=0}^{A-1} r_a(x)$:

$$[r]_n = \sum_{a=0}^{A-1} [r_a]_n \qquad \text{Eq. 5}$$

This phase does not require any communication between the computing nodes since each node n can locally compute $[r_a]_n$ for each $a \in \{0, 1, \ldots, A-1\}$.

Phase 3—Result Reconstruction
Each computing node n, $n \in \{0, 1, \ldots, N-1\}$ sends their MLC share $[r]_n$ of the result to the result nodes, which apply Lagrange interpolation to reconstruct the evaluation $r(0)$ of polynomial $r(x)$, which is equal to the output of the function we wanted to evaluate:

$$f = r(0) \leftarrow ECC([r]_0, [r]_1, \ldots, [r]_{N-1}) \qquad \text{Eq. 6a}$$

[End of Algorithm: Active D-MLC]

Figure 4:
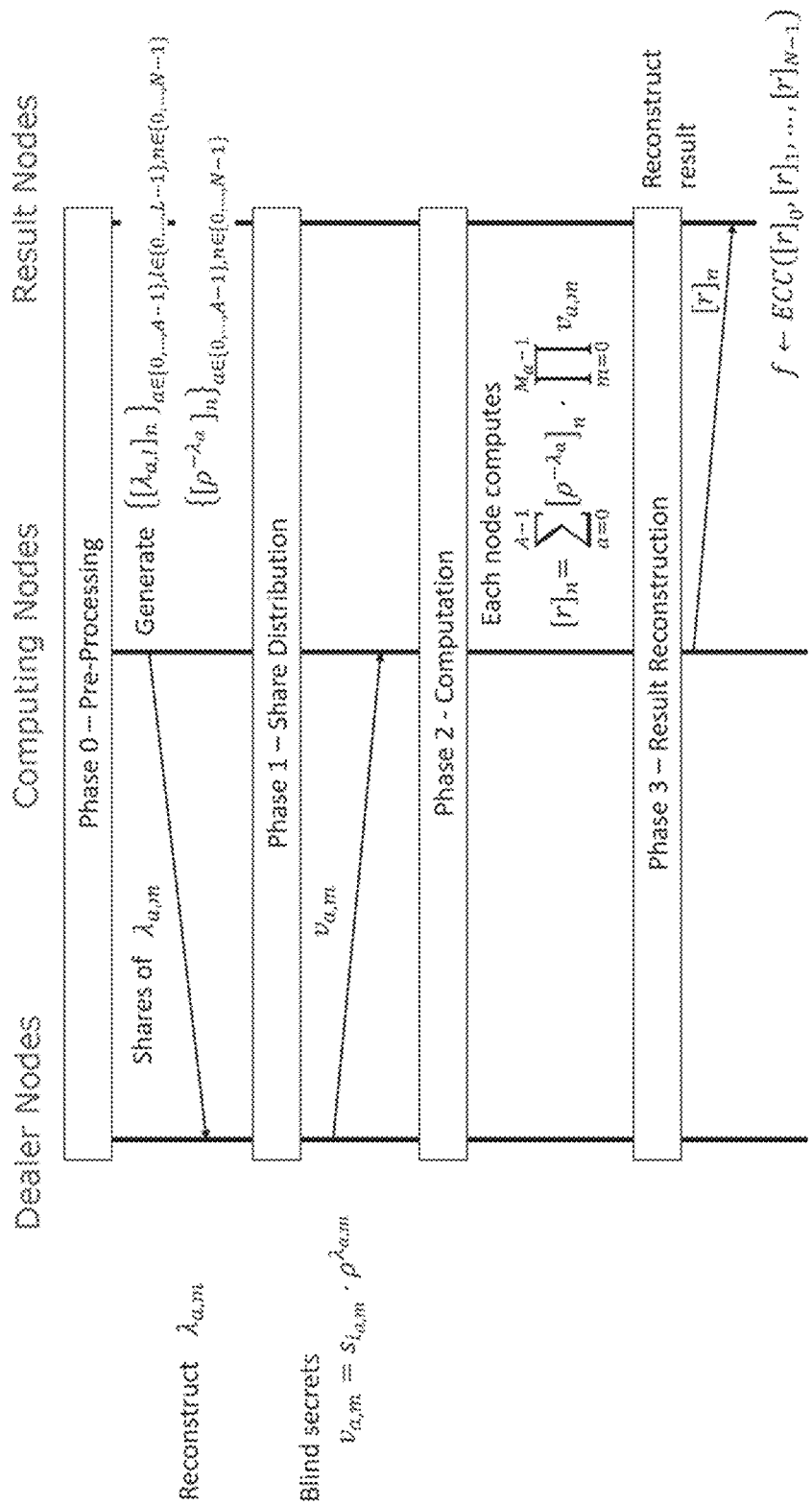
FIG. 4 is a flowchart of the message flows involved in Active D-MLC, according to an embodiment of the invention.

FIG. 4 is a flowchart of the message flows involved in Active D-MLC. As it can be appreciated, the computation phase requires no message exchange among the computing nodes. Each one independently computes (see Eq. 4):

$$[r]_n = \sum_{a=0}^{A-1} [\rho^{-\lambda_a}]_n \cdot \prod_{m=0}^{M_a-1} v_{a,m}$$

Proof for Eq. 6a.
Now we provide a proof for the main result in Eq. 6a.
Following the same reasoning from the first part of the proof of Eq. 6 in the passive adversary setup, we conclude that:

$$[r]_n = \sum_{a=0}^{A-1} \rho^{\lambda_a} \cdot [\rho^{-\lambda_a}]_n \cdot \prod_{m=0}^{M_a-1} s_{i_{a,m}}$$

That is, $[r]_n$ is a linear combination of the n-th share $[\rho^{-\lambda_a}]$, from A degree-T polynomials and hence it is the n-th share of a new degree-T polynomial $r(x)$ hiding the value:

$$r(0) = \sum_{a=0}^{A-1} \rho^{\lambda_a} \cdot \rho^{-\lambda_a} \cdot \prod_{m=0}^{M_a-1} s_{i_{a,m}} = \sum_{a=0}^{A-1} \prod_{m=0}^{M_a-1} s_{i_{a,m}} = f = f(s_0, s_1, \ldots, s_{S-1})$$

Hence, all we need to do is to interpolate the value r(0) of the polynomial r(x) from N>T+1 shares given that some of them might have been altered by the corrupted parties producing wrong shares. This can be done using error correction codes. From this, we conclude that:

$$f=r(0) \leftarrow ECC([r]_0,[r]_1,\ldots,[r]_{N-1})$$

In a preferred implementation Reed Solomon codes are used with the Berlekamp-Welch decoder [Mann13], which is incorporated herein by reference. In another implementation, a different code and/or decoder is used. The skilled person is free to choose any interpolation available to one skilled in the art to reconstruct the value of the result from the result shares. The use of error correction codes, and the choice of such code schemes, is not a limitation of this method.

Section 4: Active 1-MLC

In a third implementation, there is provided a method to evaluate an arithmetic function, the method being described and illustrated below with the algorithm Active 1-MLC.

We describe the case where all the secret inputs are coming from a single Dealer Node. This case is important since:

1. Often the secrets in a computation are coming from just one Dealer Node. This is the case for example of authentication and signatures.
   a. In authentication, the Dealer Node registers a number of factors (device identifier, password, facial biometric, pin, etc.) with the network in the form of particles. They then return providing new versions of these factors, which are sent as new particles to the network of MLC Computing Nodes. The network then jointly computes a function that allows comparing these factors and returns TRUE if they match, and FALSE if they do not match.
   b. In signatures, the Dealer Node registers a private key in the form of particles. They then return providing a message to be signed by the network. The network of MLC Computing Nodes jointly computes a function that returns the signature for the given message.
2. The restriction D=1 allows for a modified protocol that is even safer than D-MLC for active adversaries
3. The restriction D=1 allows for a modified protocol that does not require pre-processing.

The method can operate with a number of execution stages. For example, the measurements and values from a captured facial image at REGISTRATION time are transformed into particles and stored by the nodes in the network. At this point, they are not passed through a function. The particle version of each one of these datapoints constitutes in effect a "hashed value" of some aspect of the captured image. These particles can be passed to the computing nodes from the dealer node at a first execution stage.

At LOGIN time the same process is applied to the (different) captured facial image, resulting in the dealer node computing and communicating to the computing nodes, in a further execution stage, a further set of particles characterising the LOGIN image.

At the end of this process the computing nodes have particles from measurements and values from two captured facial images during registration and login times. It is at this stage that the nodes process all of these particles in order to evaluate the function $f$. What this function would typically do is to measure the "distance" between the measurements and values at registration and login times to see how similar they are. The result nodes take the individual elements of the calculated function $f$ and return a number representing this compound distance between all the measurements and values. If the number is below a threshold then we conclude that the two faces were the same.

Summarising, with the execution stage model, new particles are sent in each execution stage as the dealer gathers more and more information. Whenever all necessary particles have been collected in order to run the desired function $f$, this function is locally evaluated and a result is produced.

In Active 1-MLC the Dealer Node does not rely on the network in order to carry out the pre-processing phase. It should be noted that although all the secrets come from the same node, they can be provided at different moments in time, as the authentication and signature examples suggest. In the following protocol description, we reflect this fact by describing two different processes in Phase 1:

First Execution: This process is only executed the first time the Dealer Node wants to initiate an 1-MLC Computation (e.g. password registration in authentication, or private key registration in the signature example)

Subsequent Executions: This process is executed whenever the Dealer Node wants to add some more information to the computation (e.g. login in authentication, or message signing in the signature example). It can be executed once or more than once.

The protocol makes use of two new functions $$\text{STORE}(\{x_1,\ldots,x_j\})$$

$$\{x_1,\ldots,x_{Je}\} \leftarrow \text{LOAD}(e)$$

The function STORE stores a collection of J of variables. The function LOAD(e) retrieves a collection comprising all the Je variables from execution number e. We treat these functions as generic now and then provide a few possible implementations.

We describe the protocol assuming no pre-processing has taken place between the MLC Computing Nodes.

Algorithm: Active 1-MLC

Inputs:
One Dealer Node providing all secret inputs $S=\{s_0, s_1, \ldots, s_{S-1}\}$ to a computation. The Dealer Node wishes to compute an arithmetic function $f=f(s_0, s_1, \ldots, s_{S-1})$ over their secrets given by Eq. 1. Additional inputs follow:

N>T+1: The number of Computing Nodes in the MLC Network, where T is the degree of the Shamir polynomials p: A prime number ρ: A public generator from the multiplicative group $(Z/pZ)^x$ of integers modulo p $x_0, \ldots, x_{N-1}$ pre-agreed public abscissa for each one of the N MLC Computation Nodes used Output:
R result nodes reconstruct the function result $f=\Sigma_{a=0}^{A-1}\Pi_{m=0}^{M_a-1} s_{i_{a,m}}$ comprising A additions, whereby the a-th addition comprises $M_a$ multiplications. This function is evaluated by N computing nodes that are not able to see any of the input secrets.

Purpose:
N computing nodes can jointly evaluate any arithmetic function whilst keeping the dealer's secrets private and without any message exchange during the computation phase. A fraction of the nodes can be corrupted without compromising the correctness of the protocol.

Algorithm Steps:
The steps of the algorithm can be divided into three phases: Share Distribution, Computation and Result Reconstruction.

Phase 1—Share Distribution

The Dealer Node contributes with a collection $\{s_{i_{a,m}}\}_{a \in \{0, \ldots, A-1\} \cdot m \in \{0, \ldots, M_a-1\}}$ of input secret variables to the computation. We partition this collection according to the index corresponding with the execution. That is, if there is a total number of E executions then:

$$\{0, \ldots, A-1\} = \bigcup_{e=1}^{E} A_e$$

$$\{0, \ldots, M_a - 1\} = \bigcup_{e=1}^{E} M_{a,e}$$

where each set is disjoint, and $A_e$ and $M_{a,e}$ represent, respectively, the indices of the additions and multiplications in each addition to which the Dealer Node contributes with input secret variables during the e-th execution of Phase 1. We denote $A_e^c$ and $M_{a,e}^c$ to the complementary of sets $A_e$ and $M_{a,e}$, respectively.

First Execution (e=1):
Step 1:
For every addition $a \in \{0, \ldots, A-1\}$ and multiplication $m \in \{0, \ldots, M_a-1\}$, the Dealer Node locally computes a random dealer blinding factor $\lambda_{a,m}$ Step 2:
For every addition $a \in \{0, \ldots, A-1\}$, the Dealer Node computes:

$$\lambda_a = \sum_{m=0}^{M_a-1} \lambda_{a,m}$$

and a polynomial sharing for $\lambda_a$:

$$[\rho^{-\lambda}]_0, [\rho^{-\lambda}]_1, \ldots, [\rho^{-\lambda}]_{N-1} \leftarrow \text{SHAMIR}(\rho^{-\lambda})$$

Step 3:
For $a \in A_1$, $m \in M_{a,1}$ the Dealer Node then computes:

$$v_{a,m} = s_{i_{a,m}} \cdot \rho^{\lambda_{a,m}}$$

Step 4:
The Dealer Node sends a message to the n-th MILC Computing Node for n ∈ {0, ..., N−1} containing:
1. $\{v_{a,m}\}_{a \in A_1, m \in M_{a,1}}$,
2. $\{[\lambda_{a,m}]_n\}_{a \in \{0, \ldots, A-1\}, m \in \{0, \ldots, M_a-1\}}$, and
3. $\{[\rho^{-\lambda_a}]_n\}_{a \in \{0, \ldots, A-1\}}$.

Step 5:
Run $$\text{STORE}(\{\lambda_{a,m}\}_{a \in A_1^c, m \in M_{a,1}^c}),$$

Subsequent Executions (e>1):
Step 1:
Run $$\{\lambda_{a,m}\}_{a \in A_e, m \in M_{a,e}} \leftarrow \text{LOAD}(e)$$

Step 2:
For $a \in A_e$, $m \in M_{a,e}$, the Dealer Node then computes:

$$v_{a,m} = s_{i_{a,m}} \cdot \rho^{\lambda_{a,m}}$$

Step 3:
The Dealer Node sends a message to the n-th MILC Computing Node for n ∈ {0, ..., N−1} containing:

$$\{v_{a,m}\}_{a \in A_e, m \in M_{a,e}}$$

Note on security. Notice that T+1 nodes are required to collude to reconstruct the values $\{\rho^{-\lambda_a}\}_{a \in \{0, \ldots, A-1\}}$ because all they have is a Shamir polynomial share of these values.

Therefore, the factor $\rho^{\lambda_{a,m}}$ is effectively hiding the secret value $s_{i_{a,m}}$ and algorithm MLC inherits the security features from SSS in the passive setup, namely, it is secure against T (or less) colluding nodes.

Phase 2—Computation
Step 0:
Each Computing Node waits until it has received all $v_{a,m}$ for every addition $a \in \{0, \ldots, A-1\}$ and multiplication $m \in \{0, \ldots, M_a-1\}$.

Step 1:
Each computing node n, $n \in \{0, 1, \ldots, N-1\}$ calculates for each addition a, $a \in \{0, 1, \ldots, A-1\}$ a share from a degree-T polynomial $r_a(x)$ which is a scaled version of the polynomial hiding $\rho^{-\lambda_a}$ as a secret:

$$[r_a]_n = [\rho^{-\lambda_a}]_n \cdot \prod_{m=0}^{M_a-1} v_{a,m} \qquad \text{Eq. 4}$$

Notice that $\prod_{m=0}^{M_a-1} v_{a,m}$ is just a scalar and so $r_a(x)$ has the same degree-T as the polynomial hiding $\rho^{-\lambda_a}$ as a secret.

Step 2:
Each computing node n, $n \in \{0, 1, \ldots, N-1\}$ calculates a share from a degree-T polynomial $r(x) = \sum_{a=0}^{A-1} r_a(x)$:

$$[r]_n = \sum_{a=0}^{A-1} [r_a]_n \qquad \text{Eq. 5}$$

This phase does not require any communication between the computing nodes since each node n can locally compute $[r_a]_n$ for each $a \in \{0, 1, \ldots, A-1\}$.

Phase 3—Result Reconstruction

Each computing node n, $n \in \{0, 1, \ldots, N-1\}$ sends their MLC share $[r]_n$ of the result to the result nodes, which apply Lagrange interpolation to reconstruct the evaluation r(0) of polynomial r(x), which is equal to the output of the function we wanted to evaluate:

$$f = r(0) \leftarrow \text{ECC}([r]_0, [r]_1, \ldots, [r]_{N-1}) \qquad \text{Eq. 6b}$$

[End of Algorithm: Active 1-MLC]

Figure 5:
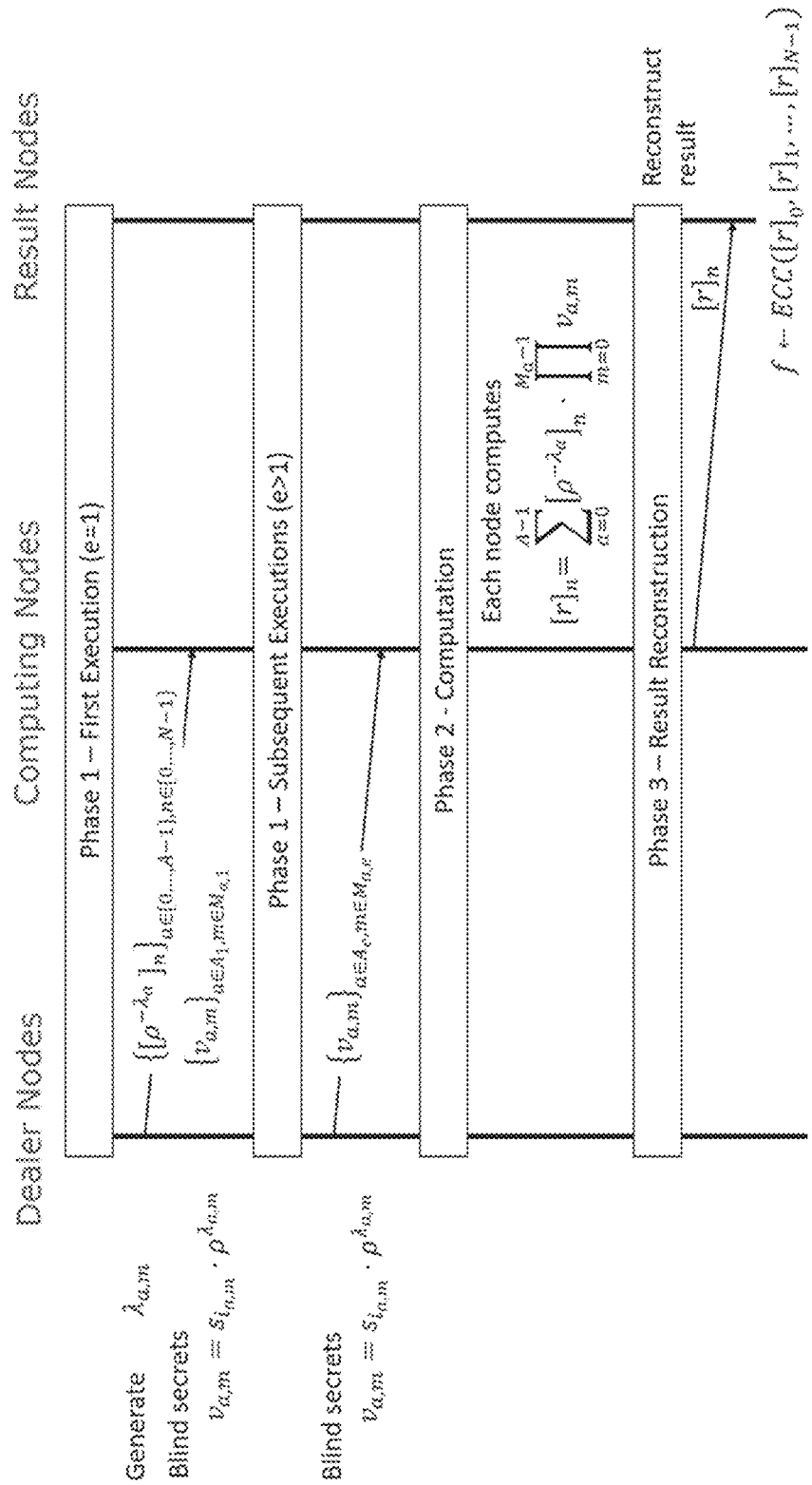
FIG. 5 is a flowchart of the message flows involved in Active 1-MLC, according to an embodiment of the invention.

FIG. 5 is a flowchart of the message flows involved in Active 1-MLC. As it can be appreciated, the computation phase requires no message exchange among the computing nodes. The correctness proof is the same as for the protocol Active D-MLC.

Notice that in Step 4 in the First Execution of Phase 1 the Dealer Node is sending the shares $\{[\lambda_{a,m}]_n\}_{a \in \{0, \ldots, A-1\} \cdot m \in \{0, \ldots, M_a-1\}}$ the n-th MLC Computing Node, for $n \in \{0, \ldots, N-1\}$. This way, for fixed a, m, the Dealer Node may instruct the MLC Computing Nodes to send back $v_{a,m}$, $\{[\lambda_{a,m}]_n\}_{n \in \{0, \ldots, N-1\}}$ so that it can reconstruct $\lambda_{a,m}$ and recover its secret input $s_{i_{a,m}}$ from the corresponding particle $v_{a,m}$. However, the shares $\{[\lambda_{a,m}]_n\}_{a \in \{0, \ldots, A-1\} \cdot m \in \{0, \ldots, M_a-1\}}$ are not required by the MLC Computing Nodes to run the computation. For this reason, in an alternative implementation, the Dealer Node does not send the shares $\{[\lambda_{a,m}]_n\}_{a \in \{0, \ldots, A-1\} \cdot m \in \{0, \ldots, M_a-1\}}$ in Step 4.2 to save bandwidth at the cost of not being able to reconstruct the inputs to the computation.

Possible Implementations for STORE and LOAD

In one implementation, the functions STORE and LOAD work on the client's device. For example, in a web browser implementation, variables are stored in cookies, or in the browser local storage, or in a mobile application they are stored in the mobile app, including the possibility of storing them in a Trusted Execution Environment or Secure Enclave.

In another implementation, variables are stored in a centralized server or group of servers, including the possibility of storing them in a Secure Enclave like Intel's SGX and/or of using encryption.

In another implementation, variables are stored in a decentralized network. For example, they are encrypted with the client's private key and sent over to a decentralized storage network, or each one is transformed into shares using for example Shamir's Secret Sharing and sent over to different nodes in a decentralized storage network.

The skilled person will appreciate that the choice of where to store and load from, and the details of implementation of the Store and Load functionality, are not limiting to the method as described.

REFERENCES

[Cra15] Cramer, R., Damgård, I., & Nielsen, J. (2015). Secure Multiparty Computation and Secret Sharing. Cambridge: Cambridge University Press. doi:10.1017/CBO9781107337756

[Sch13] Thomas Schneider and Michael Zohner. GMW vs. Yao? E_cient secure two-Party computation with low depth circuits. In Ahmad-Reza Sadeghi, editor, Financial Cryptography and Data Security, pages 275{292, Berlin, Heidelberg, 2013. Springer Berlin Heidelberg.

[Jak15] Thomas P. Jakobsen. Practical Aspects of Secure MultiParty Computation. PhD thesis, Department of Computer Science, Aarhus University, 2015.

[Yao08] Yanjun Yao. Secure multiParty computation. In Graduate Seminar on Cryptography. University of Tartu, 2008.

[GMW87] Goldreich, Oded & Micali, S. & Wigderson, Avi. (1987). How to play ANY mental game. 218-229. 10.1145/28395.28420.

[BGW88] M. Ben-Or, S. Goldwasser and A. Wigderson. Completeness Theorems for Non-Cryptographic Fault-Tolerant Distributed Computation. In the 20th STOC, pages 1-10, 1988

[BMR90] Beaver, D., S. Micali, and P. Rogaway. 1990. "The Round Complexity of Secure Protocols (Extended Abstract)". In: 22nd Annual ACM Symposium on Theory of Computing. ACM Press. 503-513

[GESS09] Kolesnikov, V. 2005. "Gate Evaluation Secret Sharing and Secure One-Round Two-Party Computation". In: Advances in Cryptology—ASIACRYPT 2005. Ed. by B. K. Roy. Vol. 3788. Lecture Notes in Computer Science. Springer, Heidelberg. 136-155

[Mann13] Mann, Sarah Edge. "The Original View of Reed-Solomon Coding and the Welch-Berlekamp Decoding Algorithm." (2013).

[SPDZ12] Damgård I., Pastro V., Smart N., Zakarias S. (2012) Multiparty Computation from Somewhat Homomorphic Encryption. In: Safavi-Naini R., Canetti R. (eds) Advances in Cryptology—CRYPTO 2012. CRYPTO 2012. Lecture Notes in Computer Science, vol 7417. Springer, Berlin, Heidelberg. https://doi.org/10.1007/978-3-642-32009-5_38

The invention claimed is:

1. A computer-implemented method, carried out between a plurality of D dealer nodes and N computing nodes, for use in calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$, $m \in \{0, 1, \ldots, M_a-1\}$ identify private input secrets from the set of S secrets, and where the S secrets are selected from integers, real numbers or complex numbers, and each secret $s_{i_{a,m}}$ is known to one of said dealer nodes, wherein the method comprises:

(a) providing each computing node n, $n \in \{0, 1, \ldots, N-1\}$, with a respective set of shares $[\alpha_{a,0}]_n$, $[\alpha_{a,1}]_n$, ..., $[\alpha_{a,L-1}]_n$, for every addition $a \in \{0, \ldots, A-1\}$ where L is a number chosen such that $L > M_a$, $\forall a \in \{0, 1, \ldots, A-1\}$ and $L > D$, and such that:

(i) the set of all the l-th shares $[\alpha_{a,l}]_n$, $l \in \{0, \ldots L-1\}$, from the N computing nodes together represent shares of a degree-T polynomial that hide a respective secret exponent blinding factor $\alpha_{a,l}$ at a certain abscissa such as $x=0$, with $N \geq T+1$; and (ii) the set of exponent blinding factors $\alpha_{a,0}$, $\alpha_{a,1}$, ..., $\alpha_{a,L-1}$ for a given addition a are all elements of the multiplicative group $(Z/pZ)^x$ of integers modulo a prime number p;

(b) providing each computing node n, $n \in \{0, 1, \ldots, N-1\}$, with a respective set of shares $[\rho^{-\lambda_a}]_n$, where:

(i) $\rho$ is a public generator from the multiplicative group $(Z/pZ)^x$ of integers modulo p;

(ii) $\lambda_a$ is a secret exponent which satisfies $$\lambda_a = \sum_{l=0}^{L-1} \alpha_{a,l}$$

(iii) the set of all the shares $[\rho^{-\lambda_a}]_n$ from the N computing nodes together represent shares of a degree-T polynomial that hide the secret value $\rho^{-\lambda}$ at a certain abscissa such as $x=0$;

(c) for each addition a comprising $M_a$ multiplications, providing each of the computing nodes with the same partition sets $P_{a,0}$, $P_{a,1}$, $P_{a,M_a-1}$ of the indexing set $\{0, 1, \ldots, L-1\}$ such that all partition sets are disjoint and non-empty;

(d) each computing node computing, for each addition a, a set of shares $[\lambda_{a,0}]_n$, $[\lambda_{a,1}]_n$, ..., $[\lambda_{a,M_a-1}]_n$ according to:

$$[\lambda_{a,m}]_n = \sum_{l \in P_{a,m}} [\alpha_{a,l}]_n$$

for $m \in \{0, \ldots, M_a-1\}$, wherein for a given addition a and multiplication m the set of the shares $[\lambda_{a,m}]_n$ for $n \in \{0, 1, \ldots, N-1\}$ together represent shares of a degree-T polynomial that hide the secret dealer blinding factor $\lambda_{a,m}$ at a certain abscissa such as x=0;

(e) each computing node n sending the respective share $[\lambda_{a,m}]_n$ for $a \in \{0, 1, \ldots, A-1\}$, $m \in \{0, 1, \ldots, M_a-1\}$, to the respective dealer node contributing the secret $s_{i_{a,m}}$ to the computation;

(f) each dealer node reconstructing, for each secret $s_{i_{a,m}}$ which it contributes to the computation, the corresponding dealer blinding factor $\lambda_{a,m}$;

(g) each dealer node sending, for each secret $s_{i_{a,m}}$ which it contributes to the computation, a particle $v_{a,m}$ to each of the computing nodes wherein:

$$v_{a,m} = s_{i_{a,m}} \cdot \rho^{\lambda_{a,m}}$$

(h) each computing node calculating, for each addition $a \in \{0, 1, \ldots, A-1\}$, a share $[r_a]_n$ from a degree-T polynomial $r_a(x)$ where:

$$[r_a]_n = [\rho^{-\lambda_a}]_n \cdot \prod_{m=0}^{M_a-1} v_{a,m}$$

(i) each computing node calculating a result share $[r]_n$ from a degree-T polynomial $r(x)$ where:

$$[r]_n = \sum_{a=0}^{A-1} [r_a]_n$$

(j) each computing node sending to one or more result node(s) their result share $[r]_n$ whereby the result node(s) may reconstruct the evaluation $r(0)$ of polynomial $r(x)$ from the received result shares $[r]_n$, said evaluation $r(0)$ being equal to the result of said arithmetic function $f$.

2. The computer-implemented method according to claim 1, wherein N=T+1.

3. The computer-implemented method according to claim 1, wherein N>T+1.

4. The computer-implemented method according to claim 3, wherein the reconstruction of at least one of said polynomials employs error correction codes.

5. The computer-implemented method according to claim 3 wherein N≥3T+1.

6. The computer-implemented method according to claim 1, wherein step (c) of providing each of the computing nodes with the same partition sets comprises each of the computing nodes calculating the partition sets according to a shared set of rules.

7. The computer-implemented method according to claim 1, wherein step (a) of providing each computing node n, $n \in \{0, 1, \ldots, N-1\}$, with a respective set of shares $[\alpha_{a,0}]_n$, $[\alpha_{a,1}]_n, \ldots, [\alpha_{a,L-1}]_n$ comprises the calculation, by a trusted node, of said sets of shares.

8. The computer-implemented method according to claim 7, wherein the calculation of said sets of shares $[\alpha_{a,0}]_n$, $[\alpha_{a,1}]_n, \ldots, [\alpha_{a,L-1}]_n$ comprises the following steps by the trusted node:

(i) computing, for each addition $a \in \{0, \ldots, A-1\}$, L random exponent blinding factors $\alpha_{a,0}, \alpha_{a,1}, \ldots, \alpha_{a,L-1} \in (Z/pZ)^x$;

(ii) computing, for each of said exponent blinding factors $\alpha_{a,l}$ where $l \in \{0, \ldots L-1\}$, N shares $[\alpha_m]_0, [\alpha_m]_1, \ldots, [\alpha_m]_{N-1}$ of a degree-T polynomial that hides the value $\alpha_{a,l}$ at a certain abscissa such as x=0.

9. The computer-implemented method according to claim 7, wherein the calculations of sets of shares by a trusted node are all carried out by the same trusted node.

10. The computer-implemented method according to claim 1, wherein step (b) of providing each computing node n, $n \in \{0, 1, \ldots, N-1\}$, with a respective set of shares $[\rho^{-\lambda_a}]_n$ comprises the calculation, by a trusted node, of said sets of shares.

11. The computer-implemented method according to claim 10, wherein the calculation of said sets of shares $[\rho^{-a}]_n$ comprises the following steps by the trusted node:

(iii) computing, for each addition $a \in \{0, \ldots, A-1\}$, the value $\rho^{-\lambda_a}$, where $$\lambda_a = \sum_{l=0}^{L-1} \alpha_{a,l}$$

(iv) computing, for each value $\rho^{-\lambda_a}$, N shares $[\rho^{-a}]_n$, $n \in \{0, 1, \ldots, N-1\}$, of a degree-T polynomial that hides the value $\rho^{-\lambda_a}$ at a certain abscissa such as x=0.

12. The computer-implemented method according to claim 1, further comprising the evaluation, by said one or more result node(s), of the value $r(0)$ of polynomial $r(x)$.

13. A non-transitory computer-program product having instructions stored thereon, the instructions, when executed by a processor, cause the processor to operate as a computing node in a computer-implemented method, carried out between a plurality of D dealer nodes and N computing nodes, for use in calculating the result of an arithmetic function $f$ which can be expressed as the addition of A groups of multiplications of a set S of private input secrets $\{S_0, S_1, \ldots, S_{S-1}\}$ such that:

$$f = f(s_0, s_1, \ldots, s_{s-1}) = m_0 + m_1 + \cdots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$, $m \in \{0, 1, \ldots, M_a-1\}$ identify private input secrets from the set of S secrets, and where the S secrets are selected from integers, real numbers or complex numbers, and each secret $s_{i_{a,m}}$ is known to one of said dealer nodes, wherein the instructions cause the processor to operate as the n-th computing node, $n \in \{0, 1, \ldots, N-1\}$ by:

(a) receiving a respective set of shares $[\alpha_{a,0}]_n$, $[\alpha_{a,1}]_n, \ldots [\alpha_{a,L-1}]_n$, for every addition $a \in \{0, \ldots, A-1\}$ where L is a number chosen such that $L > M_a$, $\forall a \in \{0, 1, \ldots, A-1\}$ and $L > D$, and such that:

(i) the set of all the l-th shares $[\alpha_{a,l}]_n$, $l \in \{0, \ldots, L-1\}$, from the N computing nodes together represent shares of a degree-T polynomial that hide a respective secret exponent blinding factor $\alpha_{a,l}$ at a certain abscissa such as x=0, with N≥T+1; and (ii) the set of exponent blinding factors $\alpha_{a,0}$, $\alpha_{a,1}, \ldots, \alpha_{a,L-1}$ for a given addition a are all elements of the multiplicative group $(Z/pZ)^x$ of integers modulo a prime number p;

(b) receiving a respective set of shares $[\rho^{-\lambda_a}]_n$, where:

(i) $\rho$ is a public generator from the multiplicative group $(Z/pZ)^x$ of integers modulo p;

(ii) $\lambda_a$ is a secret exponent which satisfies $$\lambda_a = \sum_{l=0}^{L-1} \alpha_{a,l}$$

(iii) the set of all the shares $[\rho^{-\lambda_a}]_n$ from the N computing nodes together represent shares of a degree-T polynomial that hide the secret value $\rho^{-\lambda}$ at a certain abscissa such as x=0;

(c) for each addition a comprising $M_a$ multiplications, receiving the same partition sets $P_{a,0}, P_{a,1}, \ldots, P_{a,M_a-1}$ of the indexing set $\{0, 1, \ldots, L-1\}$ such that all partition sets are disjoint and non-empty;

(d) computing, for each addition a, a set of shares $[\lambda_{a,0}]_n$, $[\lambda_{a,1}]_n, \ldots, [\lambda_{a,M_a-1}]_n$ according to:

$$[\lambda_{a,m}]_n = \sum_{l \in P_{a,m}} [\alpha_{a,l}]_n$$

for $m \in \{0, \ldots, M_a-1\}$, wherein for a given addition a and multiplication m the set of the shares $[\lambda_{a,m}]_n$ for $n \in \{0, 1, \ldots, N-1\}$ together represent shares of a degree-T polynomial that hide the secret dealer blinding factor $\lambda_{a,m}$ at a certain abscissa such as x=0;

(e) sending the respective share $[\lambda_{a,m}]_n$ for $a \in \{0, 1, \ldots, A-1\}$, $m \in \{0, 1, \ldots, M_a-1\}$, to the respective dealer node contributing the secret $s_{i_{a,m}}$ to the computation;

(f) receiving, from each dealer node contributing a secret $S_{i_{a,m}}$ to the computation, a particle $v_{a,m}$ wherein:

$$v_{a,m} = s_{i_{a,m}} \cdot \rho^{\lambda_{a,m}}$$

(g) calculating, for each addition $a \in \{0, 1, \ldots, A-1\}$, a share $[r_a]_n$, from a degree-T polynomial $r_a(x)$ where:

$$[r_a]_n = [\rho^{-\lambda_a}]_n \cdot \prod_{m=0}^{M_a-1} v_{a,m}$$

(h) calculating a result share $[r]_n$, from a degree-T polynomial r(x) where:

$$[r]_n = \sum_{a=0}^{A-1} [r_a]_n$$

(i) sending to one or more result node(s) their result share $[r]_n$, whereby the result node(s) may reconstruct the evaluation r(0) of polynomial r(x) from the received result shares $[r]_n$, said evaluation r(0) being equal to the result of said arithmetic function $f$.

14. A computing system comprising a processor programmed to operate as a computing node in a computer-implemented method, carried out between a plurality of D dealer nodes and N computing nodes, for use in calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$, $m \in \{0, 1, \ldots, M_a-1\}$ identify private input secrets from the set of S secrets, and where the S secrets are selected from integers, real numbers or complex numbers, and each secret $s_{i_{a,m}}$ is known to one of said dealer nodes, wherein the processor is programmed with instructions causing the computing system to operate as the n-th computing node, $n \in \{0, 1, \ldots, N-1\}$ by:

(a) receiving a respective set of shares $[\alpha_{a,0}]_n$, $[\alpha_{a,1}]_n, \ldots, [\alpha_{a,L-1}]_n$, for every addition $a \in \{0, \ldots, A-1\}$ where L is a number chosen such that $L > M_a$, $\forall a \in \{0, 1, \ldots, A-1\}$ and $L > D$, and such that:

(i) the set of all the l-th shares $[\alpha_{a,l}]_n$, $l \in \{0, \ldots L-1\}$, from the N computing nodes together represent shares of a degree-T polynomial that hide a respective secret exponent blinding factor $\alpha_{a,l}$ at a certain abscissa such as x=0, with N≥T+1; and (ii) the set of exponent blinding factors $\alpha_{a,0}$, $\alpha_{a,1}, \ldots, \alpha_{a,L-1}$ for a given addition a are all elements of the multiplicative group $(Z/pZ)^x$ of integers modulo a prime number p;

(b) receiving a respective set of shares $[\rho^{-\lambda_a}]_n$, where:

(i) $\rho$ is a public generator from the multiplicative group $(Z/pZ)^x$ of integers modulo p;

(ii) $\lambda_a$ is a secret exponent which satisfies $$\lambda_a = \sum_{l=0}^{L-1} \alpha_{a,l}$$

(iii) the set of all the shares $[\rho^{-\lambda_a}]_n$ from the N computing nodes together represent shares of a degree-T polynomial that hide the secret value $\rho^{-\lambda}$ at a certain abscissa such as x=0;

(c) for each addition a comprising $M_a$ multiplications, receiving the same partition sets $P_{a,0}, P_{a,1}, \ldots, P_{a,M_a-1}$ of the indexing set $\{0, 1, \ldots, L-1\}$ such that all partition sets are disjoint and non-empty;

(d) computing, for each addition a, a set of shares $[\lambda_{a,0}]_n$, $[\lambda_{a,1}]_n, \ldots, [\lambda_{a,M_a-1}]_n$ according to:

$$[\lambda_{a,m}]_n = \sum_{l \in P_{a,m}} [\alpha_{a,l}]_n$$

for $m \in \{0, \ldots, M_a-1\}$, wherein for a given addition a and multiplication m the set of the shares $[\lambda_{a,m}]_n$ for $n \in \{0, 1, \ldots, N-1\}$ together represent shares of a degree-T polynomial that hide the secret dealer blinding factor $\lambda_{a,m}$ at a certain abscissa such as x=0;

(e) sending the respective share $[\lambda_{a,m}]$ for $a \in \{0, 1, \ldots, A-1\}$, $m \in \{0, 1, \ldots, M_a-1\}$, to the respective dealer node contributing the secret $s_{i_{a,m}}$ to the computation;

(f) receiving, from each dealer node contributing a secret $s_{i_{a,m}}$ to the computation, a particle $v_{a,m}$ wherein:

$v_{a,m} = s_{i_{a,m}} \cdot \rho^{\lambda_{a,m}}$ (g) calculating, for each addition $a \in \{0, 1, \ldots, A-1\}$, a share $[r_a]_n$ from a degree-T polynomial $r_a(x)$ where:

$$[r_a]_n = [\rho^{-\lambda_a}]_n \cdot \prod_{m=0}^{M_a-1} v_{a,m}$$

(h) calculating a result share $[r]_n$ from a degree-T polynomial $r(x)$ where:

$$[r]_n = \sum_{a=0}^{A-1} [r_a]_n$$

(i) sending to one or more result node(s) their result share $[r]_n$ whereby the result node(s) may reconstruct the evaluation $r(0)$ of polynomial $r(x)$ from the received result shares $[r]_n$, said evaluation $r(0)$ being equal to the result of said arithmetic function $f$.

15. A computer-implemented method, carried out between a dealer node and N computing nodes, for use in calculating the result of an arithmetic function $f$ which can be expressed as the addition of A groups of multiplications of a set S of private input secrets $\{s_0, s_1, \ldots, s_{S-1}\}$ such that:

$$f = f(s_0, s_1, \ldots, s_{S-1}) = m_0 + m_1 + \ldots + m_{A-1} = \sum_{a=0}^{A-1} m_a$$

where each group of multiplications $m_a$, $a \in \{0, 1, \ldots, A-1\}$ is the product of $M_a$ secrets of said set S of private input secrets:

$$m_a = s_{i_{a,0}} \cdot s_{i_{a,1}} \cdot \ldots \cdot s_{i_{a,M_a-1}} = \prod_{m=0}^{M_a-1} s_{i_{a,m}}$$

and the subindices $i_{a,m}$ for $a \in \{0, 1, \ldots, A-1\}$, $m \in \{0, 1, \ldots, M_a-1\}$ identify private input secrets from the set of S secrets, and where the S secrets are selected from integers, real numbers or complex numbers, wherein the method comprises:

(a) the dealer node computing, for each addition $a \in \{0, 1, \ldots, A-1\}$ and each multiplication $m \in \{0, 1, \ldots, M_a-1\}$, a random dealer blinding factor $\lambda_{a,m}$;

(b) the dealer node computing, for each addition $a \in \{0, \ldots, A-1\}$:

$$\lambda_a = \sum_{m=0}^{M_a-1} \lambda_{a,m}$$

(c) the dealer node computing, for each addition $a \in \{0, \ldots, A-1\}$, N shares $[\rho^{-\lambda_a}]_0, [\rho^{-\lambda_a}]_1, \ldots, [\rho^{-\lambda_a}]_{N-1}$ of a degree-T polynomial that hides the value $\rho^{-\lambda_a}$ at a certain abscissa such as x=0;

(d) the dealer node computing, for each addition $a \in \{0, 1, \ldots, A-1\}$ and each multiplication $m \in \{0, 1, \ldots, M_a-1\}$, a respective particle $v_{a,m}$ where:

$v_{a,m} = s_{i_{a,m}} \cdot \rho^{\lambda_{a,m}}$ (e) the dealer node communicating, to each computing node n, $n \in \{0, 1, \ldots, N-1\}$:

iii. $\{v_{a,m}\}_{a \in \{0, \ldots, A-1\}, m \in \{0, \ldots, M_a-1\}}$,
iv. $\{[\rho^{-\lambda_a}]_n\}_{a \in \{0, \ldots, A-1\}}$;

(f) each computing node calculating, for each addition $a \in \{0, 1, \ldots, A-1\}$, a share $[r_a]_n$ from a degree-T polynomial $r_a(x)$ where:

$$[r_a]_n = [\rho^{-\lambda_a}]_n \cdot \prod_{m=0}^{M_a-1} v_{a,m}$$

(g) each computing node calculating a result share $[r]_n$ from a degree-T polynomial $r(x)$ where:

$$[r]_n = \sum_{a=0}^{A-1} [r_a]_n$$

(h) each computing node sending to one or more result node(s) their result share $[r]_n$ whereby the result node(s) may reconstruct the evaluation $r(0)$ of polynomial $r(x)$ from the received result shares $[r]_n$, said evaluation $r(0)$ being equal to the result of said arithmetic function $f$.

16. The computer-implemented method according to claim 15, wherein:

i. steps (d) and (e) are performed in a plurality of E execution stages, comprising a first execution stage and E−1 subsequent execution stages;

ii. the set of S private input secrets is partitioned into E disjoint sets corresponding to said E execution stages;

iii. the particles $v_{a,m}$ computed in step (d) and communicated in step (e) are computed in each execution stage for the secrets of a disjoint set corresponding to the execution stage; and iv. the computing nodes calculate the shares share $[r_a]_n$ in step (f) after all of the required particles $v_{a,m}$ have been received following said repeated execution stages.

17. The computer-implemented method according to claim 16, wherein the communication to the computing nodes of $\{[\rho^{-\lambda_a}]_n\}_{a \in \{0, \ldots, A-1\}}$ occurs only in one execution stage.

18. The computer-implemented method according to claim 17, wherein the communication to the computing nodes of $\{[\rho^{-\lambda_a}]_n\}_{a \in \{0, \ldots, A-1\}}$ occurs in the first execution stage.

19. The computer-implemented method according to claim 16, wherein the partitioning of the secret variables is performed according to an index e corresponding with the execution stage, wherein the addition and multiplication subindices $a \in \{0, 1, \ldots, A-1\}$, $m \in \{0, 1, \ldots, M_a-1\}$ are partitioned such that:

$$\{0, \ldots, A-1\} = \bigcup_{e=1}^{E} A_e$$

-continued $$\{0, \ldots, M_a - 1\} = \bigcup_{e=1}^{E} M_{a,e}$$

where $A_e$ and $M_{a,e}$ represent, respectively, the indices of the additions and multiplications in each addition to which the dealer node contributes with input secret variables during the e-th execution stage.

20. The computer-implemented method according to claim 19, wherein in the first execution stage (e=1) the dealer node computes in step (d) and communicates in step (e) the particles $v_{a,m} = s_{i_{a,m}} \cdot \rho^{\lambda_{a,m}}$ for $a \in A_1$, $m \in M_{a,1}$.

21. The computer-implemented method according to claim 20, wherein in each subsequent execution stage e, the dealer node computes in step (d) and communicates in step (e) the particles $v_{a,m} = s_{i_{a,m}} \cdot \rho^{\lambda_{a,m}}$ for $a \in A_e$, $m \in M_{a,e}$.

22. The computer-implemented method according to claim 16, wherein in the first execution stage, the dealer node stores to a readable memory the random dealer blinding factors $\lambda_{a,m}$ for each addition and multiplication not used in the first execution.

23. The computer-implemented method according to claim 22, wherein in each subsequent execution stage, the dealer node retrieves from said readable memory the random dealer blinding factors $\lambda_{a,m}$ required for the additions and multiplications involved in that subsequent execution stage.

24. The computer-implemented method according to claim 16, wherein step (d) further comprises sending to each computing node:

$$\{[\lambda_{a,m}]_n\}_{a \in \{0, \ldots, A-1\}, m \in \{0, \ldots, M_a-1\}}.$$

25. The computer-implemented method according to claim 24, further comprising the computing nodes sending back to the dealer node, for a given value of a, m, the values $v_{a,m}$, $\{[\lambda_{a,m}]_n\}_{n \in \{0, \ldots, N-1\}}$, and the dealer node reconstructing $A_{a,m}$ and recovering the secret input $s_{i_{a,m}}$ from the corresponding particle $v_{a,m}$.

* * * * *

UNITED STATES PATENT AND TRADEMARK OFFICE
CERTIFICATE OF CORRECTION

PATENT NO. : 12,388,629 B2
APPLICATION NO. : 18/217048
DATED : August 12, 2025
INVENTOR(S) : De Vega Rodrigo It is certified that error appears in the above-identified patent and that said Letters Patent is hereby corrected as shown below:

In the Claims

In Column 28, Claim 1, Line 62, delete "$P_{a,1}$," and insert -- $P_{a,1}, \ldots,$ --, therefor.

In Column 29, Claim 7, Line 62, delete "$[\alpha_{a,L-1}]$" and insert -- $[\alpha_{a,L-1}]_n$ --, therefor.

In Column 30, Claim 13, Line 58, delete "of'S" and insert -- of S --, therefor.

In Column 30, Claim 13, Line 67, delete "{0,1..., A-1}" and insert -- {0,1, ..., A-1} --, therefor.

In Column 31, Claim 13, Line 29, delete "$[\lambda_{a,M_a-1}]_n$," and insert -- $[\lambda_{a,M_a-1}]_n$ --, therefor.

In Column 31, Claim 13, Line 44, delete "$S_{i_{a,m}}$" and insert -- $S_{i_{a,m}}$ --, therefor.

In Column 31, Claim 13, Line 48, delete "$[r_a]_n$," and insert -- $[r_a]_n$ --, therefor.

In Column 31, Claim 13, Line 55, delete "$[r]_n$," and insert -- $[r]_n$ --, therefor.

In Column 31, Claim 13, Line 64, delete "$[r]_n$," and insert -- $[r]_n$ --, therefor.

In Column 32, Claim 14, Line 61, delete "$[\lambda_{a,M_a-1}]_n$," and insert -- $[\lambda_{a,M_a-1}]_n$ --, therefor.

Signed and Sealed this
Eleventh Day of November, 2025

John A. Squires
*Director of the United States Patent and Trademark Office*

CERTIFICATE OF CORRECTION (continued)
U.S. Pat. No. 12,388,629 B2

In Column 35, Claim 21, Line 17, delete "$v_{a,m} = S_{i_{a,m}} \cdot \rho^{\lambda_{a,m}}$" and insert --$v_{a,m} = S_{i_{a,m}} \cdot \rho^{\lambda_{a,m}}$--, therefor.

In Column 36, Claim 25, Line 17, delete "$A_{a,m}$" and insert -- $\lambda_{a,m}$ --, therefor.